(12) United States Patent
Stewart et al.

(10) Patent No.: US 12,275,280 B2
(45) Date of Patent: Apr. 15, 2025

(54) ENHANCED TRACKING OF TIRE TREAD WEAR

(71) Applicant: SENSATA TECHNOLOGIES, INC., Attleboro, MA (US)

(72) Inventors: William D. Stewart, Antrim (GB); Jonathan Wilgar, Carrickfergus (GB)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 203 days.

(21) Appl. No.: 17/926,584

(22) PCT Filed: Jun. 5, 2020

(86) PCT No.: PCT/US2020/036240
§ 371 (c)(1),
(2) Date: Nov. 19, 2022

(87) PCT Pub. No.: WO2021/247036
PCT Pub. Date: Dec. 9, 2021

(65) Prior Publication Data
US 2023/0202241 A1    Jun. 29, 2023

(51) Int. Cl.
*B60C 11/24* (2006.01)

(52) U.S. Cl.
CPC .......... *B60C 11/246* (2013.01); *B60C 11/243* (2013.01)

(58) Field of Classification Search
CPC ............................ B60C 11/246; B60C 11/243
See application file for complete search history.

(56) References Cited

U.S. PATENT DOCUMENTS

| | | | |
|---|---|---|---|
| 9,831,922 B1* | 11/2017 | Robinson | B60C 11/24 |
| 9,921,134 B2 | 3/2018 | Unterreiner et al. | |
| 10,518,590 B2 | 12/2019 | Stewart et al. | |
| 2006/0156790 A1* | 7/2006 | Bocquillon | B60C 11/246 |
| | | | 73/8 |
| 2014/0107946 A1 | 4/2014 | Kandler et al. | |
| 2015/0034222 A1 | 2/2015 | Martin et al. | |

(Continued)

FOREIGN PATENT DOCUMENTS

| | | |
|---|---|---|
| CN | 108790619 A | 11/2018 |
| DE | 10306498 A1 | 8/2004 |

(Continued)

OTHER PUBLICATIONS

International Search Report & Written Opinion for PCT/US2020/036240, dated Jan. 27, 2021, 16 pages.

*Primary Examiner* — Michael J Zanelli
(74) *Attorney, Agent, or Firm* — Mark H. Williams

(57) ABSTRACT

Methods, apparatuses, computer program products, systems for enhanced tracking of tire tread wear are disclosed. In a particular embodiment, a tire monitoring sensor (TMS) detects a tread wear reporting event, generates tread wear data including at least a rotational time period, and transmits the tread wear data to a vehicle control system (VCS). The rotational time period may be a measure of time the tire takes to complete a particular number of revolutions. The VCS receives, from the TMS, the tread wear data including at least the rotational time period, determines a current circumference of the tire based on at least the rotational time period, and determines a tread wear value based on at least the current circumference.

18 Claims, 23 Drawing Sheets

(56) References Cited

U.S. PATENT DOCUMENTS

2016/0247329 A1\* 8/2016 Lavoie .................... B60C 11/00
2021/0134082 A1\* 5/2021 Wilgar .................. B60T 8/1725
2022/0024259 A1\* 1/2022 Fraenkel ............... B60C 11/243

FOREIGN PATENT DOCUMENTS

| DE | 102012217901 | | 5/2014 |
|----|--------------|-----|---------|
| DE | 102014214465 | A1 | 1/2016 |
| DE | 102018206858 | A1 | 11/2019 |
| EP | 3121034 | A1 | 8/2018 |
| GB | 2531746 | A | 5/2016 |
| WO | 2018104876 | A1 | 6/2018 |

\* cited by examiner

ENHANCED TRACKING OF TIRE TREAD WEAR

BACKGROUND

In the interest of vehicle safety and regulatory compliance, it is important to monitor the amount of tread wear on a tire. For example, a worn tire is more prone to skidding or puncture, and many jurisdictions mandate a minimum amount of tread depth that must remain on vehicle tires. The task of monitoring tire tread wear can be cumbersome, particular when managing a fleet of vehicles. To that end, electronic monitoring systems are often used to estimate or calculate the amount of tread wear on a tire.

One technique for determining tire tread wear is based on the comparison of the rolling radius of the tire. While there are various parameters that influence the rolling radius, its value is indicative of the tire circumference. Parameters monitored to determine the rolling radius are direct tire pressure and vertical force applied to each tire provided by a tire force determination unit. A rolling radius factor is determined and compensated using the data retrieved from the measurement of direct pressure and vertical tire force (load). The vertical tire force is derived by using vehicular force or inclination/ride height sensors. This technique relies on analysis of and access to data from vehicle mounted wheel speed sensors as well as the vehicle mounted tire force sensors (e.g., inclination/ride height sensors). However, access to such sensors may be limited as some vehicles are not equipped with those sensors or access to the vehicle control bus may be denied or limited, especially in a fleet/retrofit system scenario.

Another technique for determining tire tread wear is based on determining the number of wheel rotations/revolutions over a fixed distance and comparing these with expected rotations of a new tire. Determining this difference enables the system to estimate the level of tread wear. An advantage of such a solution is that that it does not rely on access to vehicle mounted wheel speed or ride height sensors. However, this technique relies on detecting the difference in the number of wheel revolutions based on millimeters of tire tread wear, large distances (typically 2 to 10 kilometers) must be driven in order to provide a suitable number of rotational count deltas.

SUMMARY

Embodiments in accordance with the present disclosure are directed to enhanced techniques for tracking tire tread wear using a tire monitoring sensor that measures a rotational time period for a relatively small number of revolutions. These embodiments benefit from steady state driving conditions that occur over short distances because a much smaller fixed number of revolutions are required to determine tire circumference, and the rotational time period for this number of revolutions is measured at the tire monitoring sensor. Thus, unlike other techniques that require counting a large number of revolutions over a long distance to determine a rotational count value, embodiments in accordance with present disclosure may acquire a nearly instantaneous tire circumference measurement (e.g., within 10 revolutions of the tire in a steady state). Furthermore, unlike other techniques that require access to wheel speed sensor data that is not always available, embodiments in accordance with the present disclosure may be implemented in control units that do not always have such access (e.g., in an aftermarket solution).

In a particular embodiment, a tire monitoring sensor (TMS) detects a tread wear reporting event, generates tread wear data including at least a rotational time period, and transmits the tread wear data to a vehicle control system. The rotational time period may be a measure of time the tire takes to complete a particular number of revolutions. In some embodiments, the tread wear reporting event may be determined when certain conditions are met or when a request is received from the vehicle control system. Before generating the tread wear data, the TMS may first determine that the tire is operating in steady state conditions so that an accurate measurement may be obtained. Generating the rotational time period data may be carried out by sampling accelerometric signals from an accelerometer; generating an accelerometric waveform from the sampled accelerometric signals, identifying a sequence of peaks in the accelerometric waveform, where the distance between each peak is indicative of one revolution; counting the number of sampled accelerometric signals between each peak; and determining, based on the number of sampled accelerometric signals, the length of time for the tire to complete a particular number of revolutions. To ensure that reference data for the tire in an unused state is available after removal of the tire, the TMS may receive, from the vehicle control system, a reference tire dimension, store the reference tire dimension, and later send the reference tire dimension to the vehicle control system for calculating the tread wear value.

In another particular embodiment, a vehicle control system receives, from the tire monitoring sensor (TMS), tread wear data including at least a rotational time period, determines a current circumference of the tire based on at least the rotational time period, and determines a tread wear value based on at least the current circumference. The rotational time period may be a measure of time the tire takes to complete a particular number of revolutions. In some embodiments, to determine the current circumference of the tire, the vehicle control system may obtain a linear velocity of the vehicle (e.g., via a GPS receiver), determine a linear distance traveled by the tire based on the linear velocity and the rotational time period, and determine the current circumference of the tire based on the linear distance and the particular number of revolutions. To determine the tread wear value, the current radius of the tire (based on the current circumference) may be compared to a reference radius, and the tread wear value may be determined based on the comparison. The vehicle control system may further apply compensation variables such as angular speed of the tire, tire stiffness, road surface, tire slip, tire pressure, tire temperature, effective rolling radius, and vehicle mass. Furthermore, based on data collected from vehicle sensors, the vehicle control system may wait until it is determined that the vehicle is in a steady state before requesting tread wear data from the TMS. Also, the vehicle control system may calculate a reference tire dimension based on data collected from the TMS when the tire is new and communicate the reference dimension to the TMS for storage in the TMS.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1A:
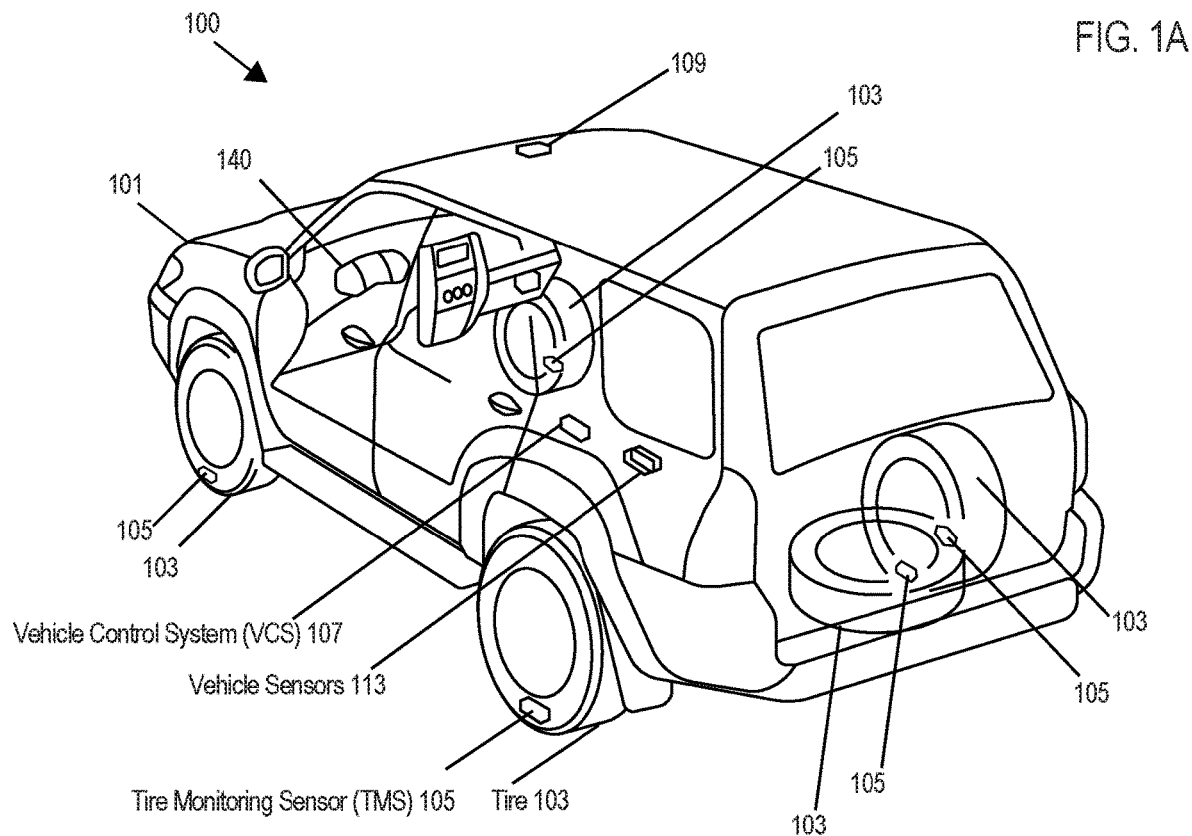
FIG. 1A sets forth an isometric diagram of a system for enhanced tracking of tire tread wear in accordance with the present disclosure.
Figure 1B:
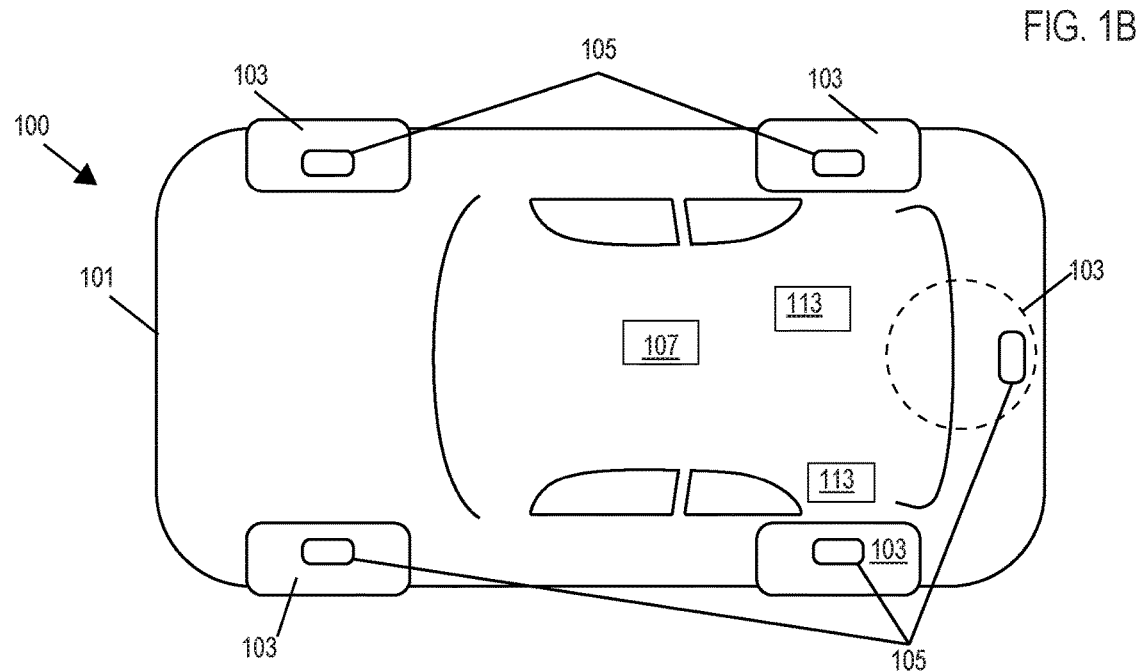
FIG. 1B sets forth a top view of the system of FIG. 1A.

Exemplary methods, apparatuses, and computer program products for enhanced tracking of tire tread wear in accordance with the present disclosure are described with reference to the accompanying drawings, beginning with FIG. 1. FIG. 1A sets forth an isometric diagram of a system (100) for enhanced tracking of tire tread wear in accordance with the present disclosure. FIG. 1B sets forth a top view of the system of FIG. 1A. The system of FIG. 1 includes a vehicle (101) equipped with tires (103) that include tire monitoring sensor (TMS) (105). A TMS is a sensor that is configured to monitor and transmit parameters of a tire. According to embodiments of the present disclosure, a TMS may be coupled to some portion of the tire (e.g., mounted to an inner portion of the tire). In at least one embodiment, the TMS may be coupled to a valve stem of the tire. As will be explained in greater detail below, a TMS may transmit tire parameters to a receiver of a tire pressure monitoring system (TPMS).

The vehicle of FIG. 1 further includes a vehicle control system (VCS) (107) that controls various components and systems within a vehicle. In a particular embodiment, the VCS (107) includes a plurality of electronic control units (ECUs) that are configured to control one or more vehicle subsystems. Commonly referred to as the vehicle's "computers", an ECU may be a central control unit or may refer collectively to one or more vehicle subsystem control units, such as an Engine Control Module (ECM), a Powertrain Control Module (PCM), a Transmission Control Module (TCM), a Brake Control Module (BCM), a Central Timing Module (CTM), a General Electronic Module (GEM), or a Suspension Control Module (SCM). In an embodiment according to the present disclosure, the VCS (107) includes a BCM that includes an Antilock Braking System (ABS) and an Electronic Stability Program (ESP). Alternatively, the VCS (107) may comprise a Telematics Control Unit (TCU) independent of vehicle-based sensors (e.g., an aftermarket system). In the example of FIG. 1, the vehicle (101) includes a dashboard display screen (140) for displaying messages from the VCS (107). For example, the VCS (107) may send a 'low tire pressure' message to a component connected to the dashboard display screen (140). In this example, in response to receiving the 'low tire pressure' message, the component may turn on a 'low tire pressure' indicator that is displayed on the dashboard display screen (140).

Each TMS (105) may be equipped with a wireless transceiver for bidirectional wireless communication with the VCS (107), as will be described in more detail below. The VCS is similarly equipped with a wireless transceiver for bidirectional wireless communication with each of the TMSs (105), as will be described in more detail below. The bidirectional wireless communication may be realized by low power communication technology such as Bluetooth Low Energy or other low power bidirectional communication technology that is intended to conserve the amount of energy consumed. Alternatively, each TMS (105) may include a unidirectional transmitter configured to transmit signals to the VCS (107). In some embodiments, each TMS (105) may communicate directly with a smart device (not shown), such as a smart phone, tablet, or diagnostic tool, as will be described in more detail below.

Each vehicle system may include sensors (113) used to measure and communicate vehicle operating conditions. For example, the ABS may include wheel speed sensors on the wheelbase used to measure wheel speed. The ESP subsystem may include yaw rate sensors configured to measure the yaw-induced acceleration of the vehicle when the vehicle is maneuvering a curve. Readings from such sensors (113) may be provided to the VCS (107), which may provide parameters based on these readings to the TMS (105).

The vehicle (101) may further include a transceiver (109) communicatively coupled to the VCS (107) for cellular terrestrial communication, satellite communication, or both.

The arrangement of devices making up the exemplary system illustrated in FIG. 1 are for explanation, not for limitation. Data processing systems useful according to various embodiments of the present disclosure may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), Bluetooth protocol, Near Field Communication, Controller Area Network (CAN) protocol, Local Interconnect Network (UN) protocol, FlexRay protocol, and others as will occur to those of skill in the art. Various embodiments of the present disclosure may be implemented on a variety of hardware platforms in addition to those illustrated in FIG. 1.

Figure 2A:
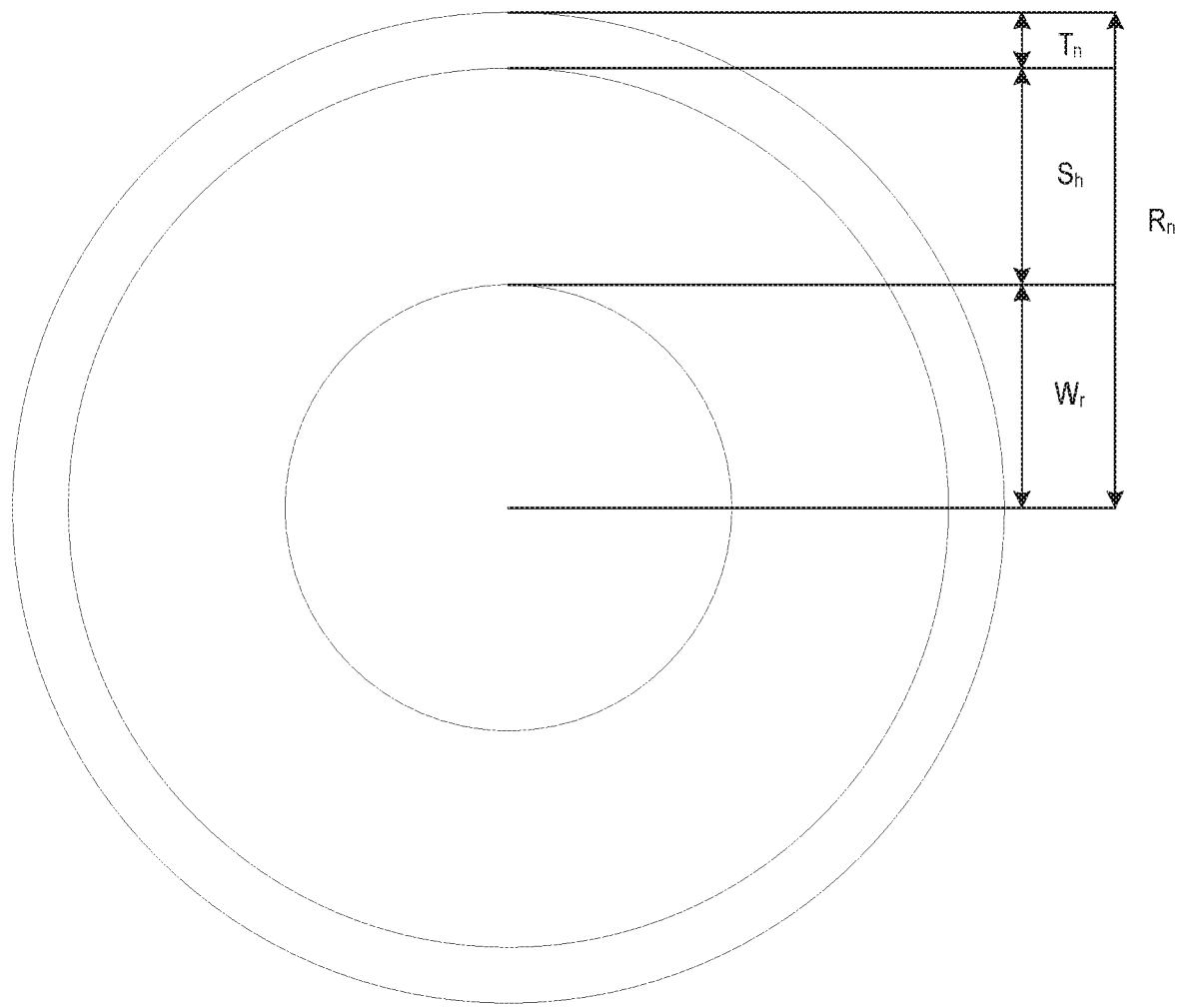
FIG. 2A illustrates a diagram of exemplary tire dimensions in accordance with the present disclosure.

FIG. 2A illustrates example dimensions of a new tire (201). As used in this disclosure $W_r$ is the radius of the wheel rim upon which the tire (201) is mounted. $S_h$ is the height of the sidewall of the tire (201) between the rim and the base of the tread, and $T_n$ is the height (depth) of the tread when the tire is new. Thus, the total radius of the new tire is $R_n=W_r+S_h+T_n$. The total diameter of the new tire is $2R_n$, and the total circumference is $2\pi R_n$.

Figure 2B:
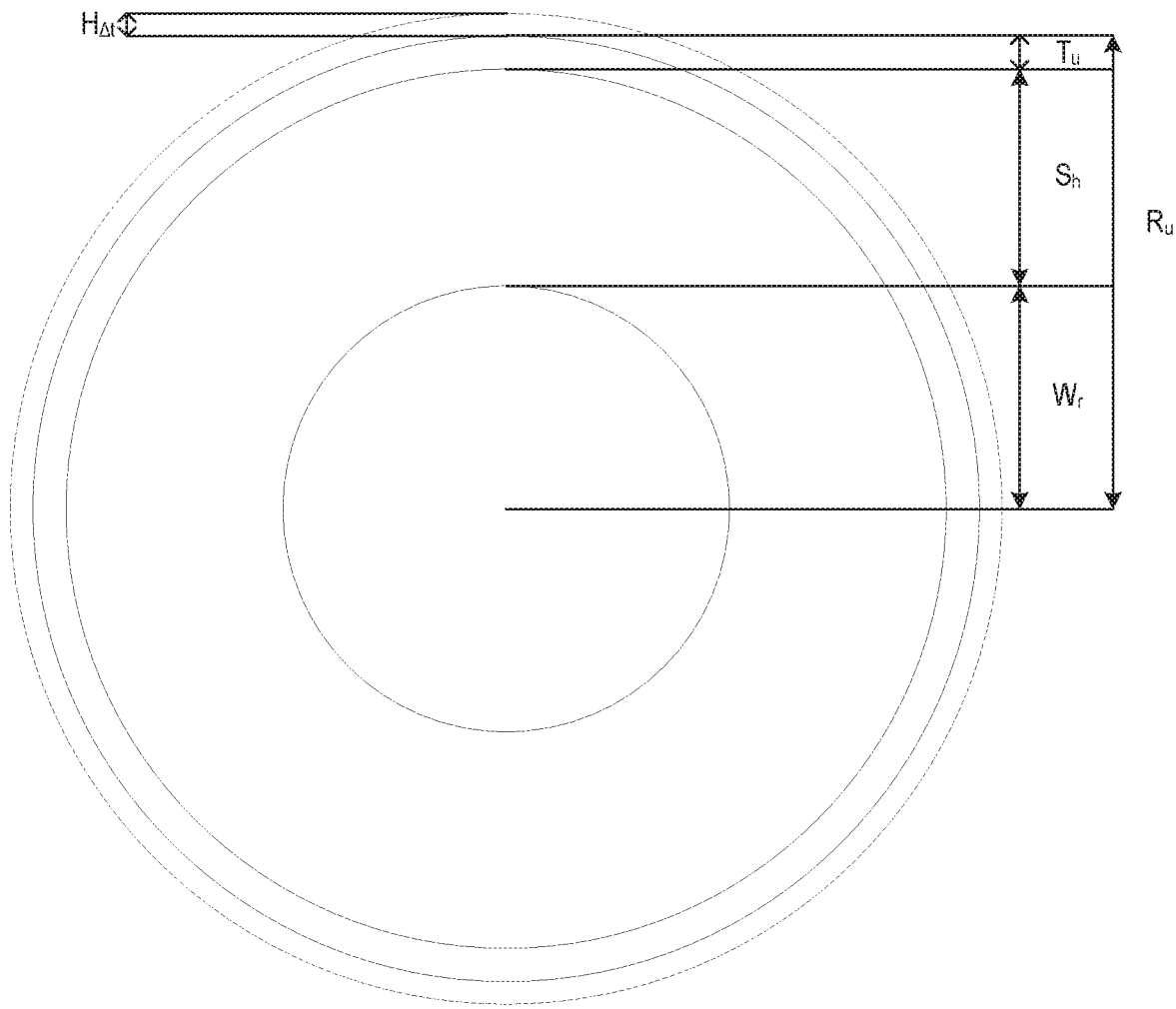
FIG. 2B illustrates a diagram of exemplary tire dimensions in accordance with the present disclosure.

FIG. 2B illustrates example dimensions of a used tire (202). Like the tire (201) of FIG. 2A, $W_r$ is the radius of the wheel rim upon which the tire (202) is mounted and $S_h$ is the height of the sidewall of the tire (201) between the rim and the base of the tread. $T_u$ is the height (depth) of the tread after some amount of use. Thus, the total radius of the used tire is $R_u=W_r+S_h+T_u$. The total diameter of the new tire is $2R_u$, and the total circumference is $2\pi R_u$. With a measurement of the circumference of the used tire, and given that $W_r$ and $S_h$ remain constant, the radius $R_u$ is indicative of the reduction thread. A tread wear value for the reduction in tread may be expressed in numerous ways as derived from the radius, and thus circumference, of the tire and tire dimension data. For example, a tread wear percentage may be expressed as TW %$=((R_n-R_u)/T_n)*100$. A reduction in tread height may be expressed as $H_{\Delta t}=R_n-R_u$. A current tread depth may be expressed as $H_t=T_n-(R_n-R_u)$.

Figure 3:
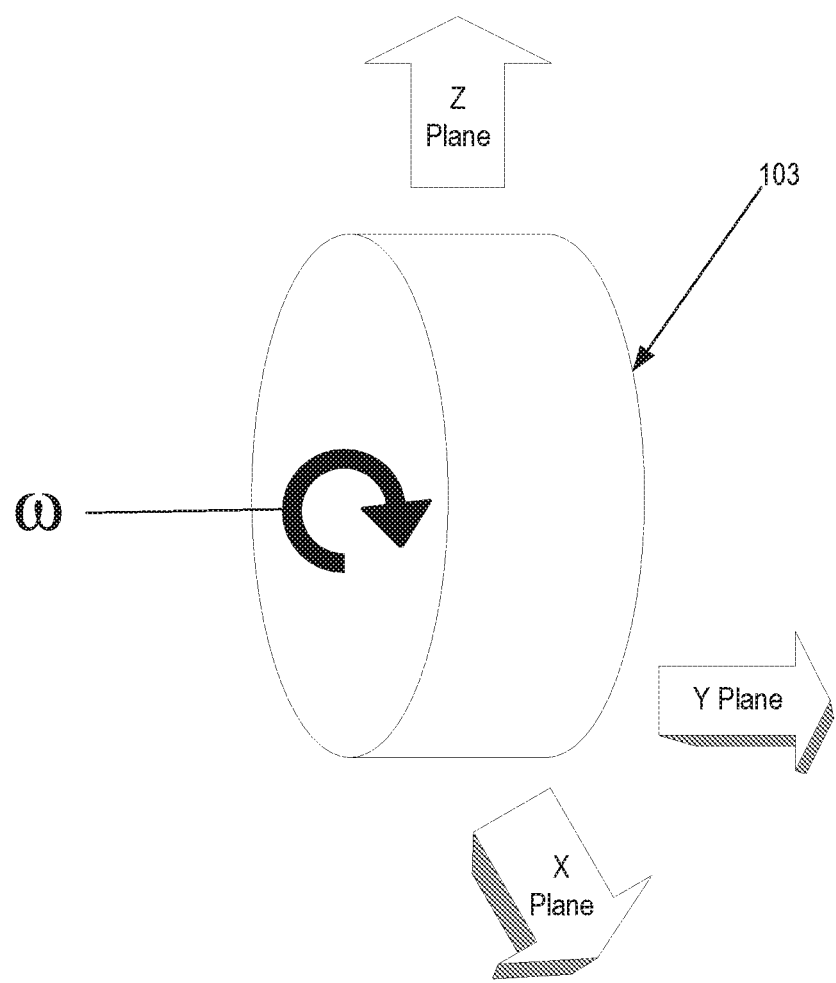
FIG. 3 illustrates a reference diagram of a tire in accordance with the present disclosure.

FIG. 3 illustrates a reference diagram of a tire (103) in accordance with the present disclosure. As used in this disclosure, the z-axis of the (103) is the direction of radial force during rotation, the y-axis of the tire is the direction of lateral force during rotation, and the x-axis of the tire (103) is the direction of tangential force during rotation. The angular speed of rotation, in radians, is represented by ω, and is also referred to herein as wheel speed.

Figure 4:
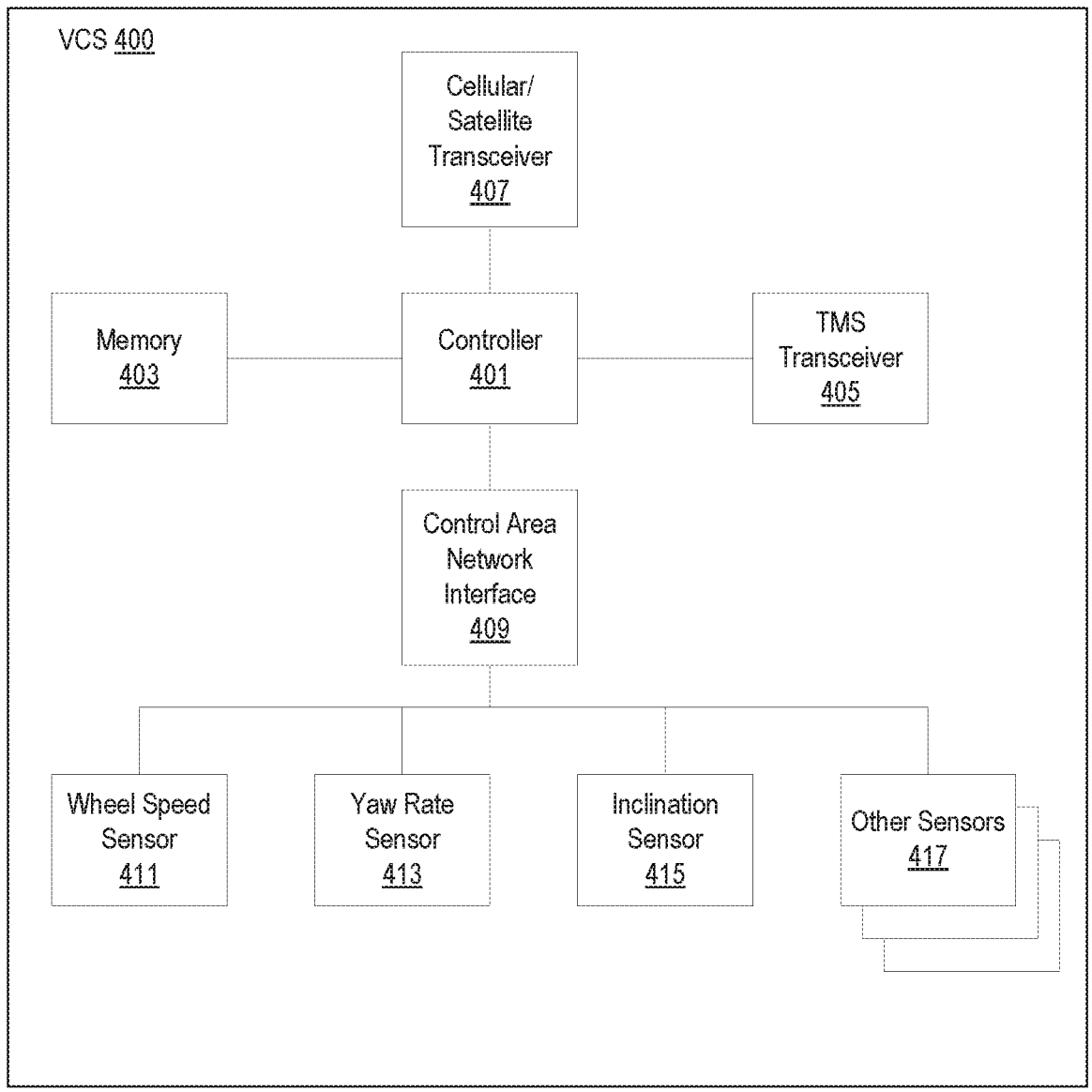
FIG. 4 illustrates a block diagram of an exemplary vehicle control system in accordance with the present disclosure.

For further explanation, FIG. 4 sets forth a diagram of an exemplary vehicle control system (VCS) (400) for enhanced tracking of tire tread wear according to embodiments of the present disclosure. The VCS (400) includes a controller (401) coupled to a memory (403). The controller (401) is configured to obtain sensor readings related to vehicle operating conditions, as well as data from sources external to the vehicle, and provide configuration parameters to a TMS, such as TMS (600) (see FIG. 6). The controller may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The sensor readings and data, as well as tire feature data received from the TMS, may be stored in the memory (403). The memory (403) may be a non-volatile memory such as flash memory. For example, the VCS (400) may obtain vehicle operating condition data, such as sensor readings from sensors on-board the vehicle.

For bidirectional wireless communication with a TMS, the VCS (400) includes a TMS transceiver (405) coupled to the controller (401). In one embodiment, the TMS transceiver (405) is a Bluetooth Low Energy transmitter-receiver. In other embodiments, the TMS transceiver (405) may be other types of low power radio frequency communication technology that is intended to conserve energy consumed in the TMS. The VCS (400) may further include a transceiver (407) for cellular terrestrial communication, satellite communication, or both.

The VCS (400) may further comprise a controller area network (CAN) interface (409) for communicatively coupling vehicle sensors and devices to the controller (401). Of particular relevance to the present disclosure, the CAN interface (409) couples a wheel speed sensor (411), a yaw rate sensor (413), an inclination sensor (415), and other sensors (417), to the controller (401). The wheel speed sensor (411) measures the rotational angular speed of the wheel, e.g., in radians per second. The yaw rate sensor (413) may be used to measure the yaw-induced acceleration of the vehicle, for example, when the vehicle is maneuvering a curve, which will influence the magnitude of loading on each tire. The yaw rate sensor (413) may also provide information on the shear forces on the tire where it contacts the road. The inclination sensor (415) may detect longitudinal and/or transverse inclination of the vehicle. The wheel speed sensor (411), the yaw rate sensor (413), and the inclination sensor (415) transmit respective readings to the controller (401).

The controller (401) is configured to receive, from the TMS, tread wear data including at least a rotational time period; determine, in dependence upon at least the rotational time period, a current circumference of the tire; and determine, in dependence upon at least the current circumference, a tread wear value. For example, the tread wear value may be a current or remaining tread depth, a tread depth relative to an original tread depth, and/or a relative reduction in tread based on at least the current circumference of the tire. Logic for to receiving the tread wear data including at least a rotational time period from the TMS, for determining the current circumference of the tire based on at least the rotational time period, and for determining of the tread wear value based on the current circumference may be embedded in logic blocks of the controller (401) or stored as a set of executable instructions in the memory of the VCS (400).

To receive the tread wear data including at least the rotational time period, the controller (401) may request the tread wear data by polling the TMS or sending a message requesting the tread wear data. The controller (401) may also prompt the TMS to provide the data in response to a wake-up signal. Further, the controller (401) may receive the data from the TMS as part of an unsolicited broadcast of tread wear data. The rotational time period is a measure of time the tire takes to complete a particular number of revolutions. The particular number of revolutions may be fixed number of revolutions that is known to both the VCS (400) and the TMS or may be established through communication between the VCS (400) and the TMS. For example, the controller (401) may indicate to the TMS how many revolutions of the tire to measure, or the TMS may inform the controller (401) of how many revolutions were measured for the rotational time period. In some embodiments, the controller may detect a tread wear reporting event that prompts the controller (401) to request tread wear data from the TMS. For example, the tread wear reporting event may be that a particular number of journeys have been completed, a particular amount of time has passed, or a particular number of miles have been traveled since tread wear data was last received. In response to determining that the tread wear reporting event has been detected, the controller (401) may first establish that the vehicle is operating in a steady state condition before requesting the tread wear data from the TMS. For example, the steady state condition be that vehicle speed and acceleration are nearly constant, that a vehicle speed threshold has been met, that the vehicle is not maneuvering a corner, that the vehicle is not at an incline, and/or that tire temperature and pressure are constant. Once it is determined that a steady state has been achieved, the controller (401) may poll the TMS for the tread wear data.

The controller (401) may be further configured to determine, in dependence upon at least the rotational time period, a current circumference of the tire. For example, the rotational time period may be used in conjunction with the linear velocity of the vehicle to calculate the current tire circumference. The linear velocity of the wheel center may be based on Global Positioning System (GPS) doppler data. GPS doppler data may be obtained from the cellular/satellite transceiver (407) or from another position tracking data source. In this manner, the controller (401) does not depend on other sensors for determining a linear velocity of the vehicle. The controller may be further configured to, after determining the linear velocity, determine the linear distance traveled by the tire from the linear velocity and the rotational time period obtained from the TMS. Once the linear distance for the particular number of revolutions is known, the circumference of the tire may be determined by dividing the linear distance by the number of revolutions.

The controller (401) may be further configured to determine a tread wear value based on at least the current circumference. The controller derives a current radius from the current circumference and compares the current radius to a reference radius. For example, the reference radius may be the manufacturer specified radius of the tire when it is new, or a reference radius calculated by the controller when the tire was new. By comparing the current radius to the reference radius, as discussed with reference to FIG. 2B, a tread wear value may be determined. Prior to deriving the tire tread wear value, the controller may adjust, based on compensation variables, the current radius, the reference radius, or both. For example, the compensation variables may include the angular speed of the tire from a wheel sensor, a tire stiffness parameter from the TMS, road surface, tire slip, tire pressure from the TMS, tire temperature, tire mass, vehicle mass, and other variables that will be appreciated by those of skill in the art. It will be recognized that such variables may affect the radius of the tire. To compensate, these variables should be accounted for in either the current radius measured while the tire is in motion or in the reference radius if a non-rolling radius is used for the reference radius.

The controller (401) may be further configured to, prior to receiving the tread wear data, calculate a reference tire dimension based on data collected from the TMS. For example, when the tire relatively new (shortly after installation of the tire and within a period of first use), the TMS may report rotational period data to the controller (401). The controller (401) can then calculate a reference tire dimension (e.g., rolling radius) of the tire while it is still relatively new. The reference tire dimension can then be used for further calculations of a tread wear value. To ensure that the reference data stays with the TMS (e.g., when it is removed from the vehicle), the controller (401) transmits, via the transceiver (405), the reference tire dimension to the TMS for storage in the TMS. Before a subsequent calculation of the tread wear value, the controller (401) may receive the reference tire dimension stored in the TMS from the TMS via the transceiver (405).

The controller (401) may be further configured to receive, prior to calculating the tread wear value, one or more tire parameters from the TMS. The one or more tire parameters may include at least one of a TMS identifier, tire identification data, tire dimension data, a tire pressure parameter, a tire temperature parameter, a tire mass parameter, a tire load parameter, a tire deformation parameter, and a tire stiffness parameter. For example, the TMS identifier, tire identification data, and tire dimension data may be received in response to a particular event or in response to a wake-up signal. The tire pressure parameter, tire temperature parameter, tire load parameter, tire deformation parameter, and/or tire stiffness parameter may be transmitted as part of the tread wear data or nearly contemporaneous with the tread wear data including the rotational time period. The tire stiffness may be expressed as one or more tire stiffness parameters. For example, the one or more tire stiffness parameters may comprise one or more tire stiffness coefficients in a polynomial function for tire stiffness. For example, the one or more tire stiffness coefficients may be determined for a given tire model under varying loads and pressures using a drum tester, tire load compression testing on a static tire, or tire modeling. The one or more tire stiffness coefficients may then be stored in the TMS of a tire at manufacture or at another time.

The controller (401) may be further configured to calculate the rolling radius of the tire as a ratio of the linear velocity of the wheel center to the angular velocity of the wheel. The linear velocity of the wheel center may be based on Global Positioning System (GPS) doppler data. The angular velocity of the wheel may be based on data from a wheel speed sensor (411) or a TMS. For example, the wheel speed sensor (411) may be a component of an Antilock Braking System (ABS). The controller (401) may then calculate the rolling radius of the tire based on the data indicating the linear velocity of the wheel and the angular velocity of the wheel.

Figure 5A:
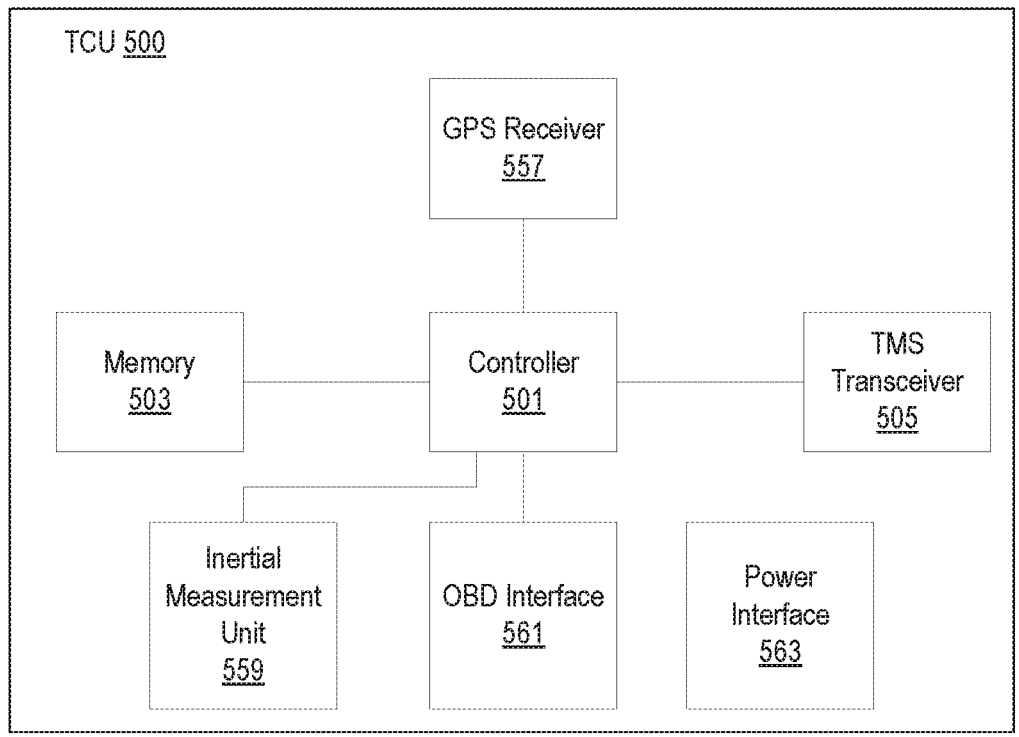
FIG. 5A illustrates a block diagram of an exemplary Telematics Control Unit (TCU) in accordance with the present disclosure.

For further explanation, FIG. 5A sets forth a diagram of an embodiment of a Telematics Control Unit (TCU) (500) (e.g., an aftermarket system not directly coupled to vehicle-based sensors). The TCU (500) of FIG. 5A includes a controller (501), memory (503), and TMS transceiver (505) performing similar functions as described above with respect to the VCS (400) FIG. 4. The TCU (500) also includes a Global Positioning System (GPS) receiver (557) configured to communicate with one or more GPS satellites in order to determine a vehicle location, speed, direction of movement, etc. The ICU (500) also includes an inertial measurement unit (IMU) (559) configured to measures a vehicle's specific force, angular rate, and/or orientation using a combination of accelerometers, gyroscopes, and/or magnetometers. The ICU (500) also includes an on-board diagnostics (OBD) interface (561) for coupling the TCU (500) to one or more on-board diagnostic devices of a vehicle. The TCU (500) may receive power via a power interface (563) couplable to a vehicle power bus.

In a particular embodiment, the controller (501) of the TCU (500) may be configured like the controller (401) of the VCS (400) of FIG. 4 to determine the tread wear value, even though the TCU (500) may not have access to other vehicle subsystems through the CAN interface (409) of the VCS (400). Thus, the controller (501) of the TCU (500) may also be configured to receive, from the tire monitoring sensor (TMS), tread wear data including at least a rotational time period; determine, in dependence upon at least the rotational time period, a current circumference of the tire; and determine, in dependence upon at least the current circumference, a tread wear value.

Figure 5B:
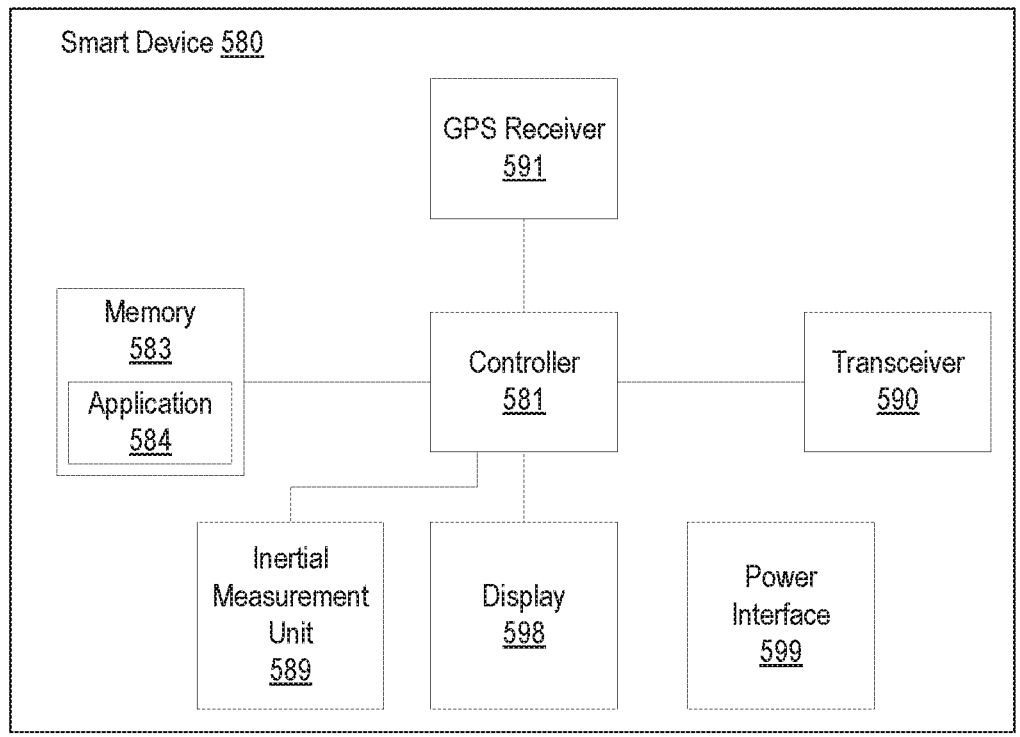
FIG. 5B illustrates block diagram of an exemplary smart device in accordance with the present disclosure.

For further explanation, FIG. 5B sets forth a diagram of an embodiment of a smart device (580) (e.g., a smart phone or a tablet physically detached from the vehicle). The smart device (580) of FIG. 5B includes a controller (581), memory (583), and a transceiver (590) (e.g., a Bluetooth transceiver). For example, the transceiver (590) is configured to communicate with the TMS and/or the VCS. The smart device (580) also includes a Global Positioning System (GPS) receiver (591) configured to communicate with one or more GPS satellites in order to determine a vehicle location, speed, direction of movement, etc. The smart device (580) also includes an inertial measurement unit (IMU) (589) configured to measures the device's specific force, angular rate, and/or orientation using a combination of accelerometers, gyroscopes, and/or magnetometers. The smart device (580) also includes a display (598) that displays, for example, a tread wear value associated with a tire. The smart device (580) may receive power from a power interface (599) couplable to a battery or to a vehicle power source.

In a particular embodiment, the controller (581) of the smart device (580) may be configured like the controller (401) of the VCS (400) of FIG. 4 to determine the tread wear value, even though the smart device (580) may not have access to vehicle subsystems through the CAN interface (409) of the VCS (400). Thus, the controller (581) of the smart device (580) may also be configured to receive, from the tire monitoring sensor (TMS), tread wear data including at least a rotational time period; determine, in dependence upon at least the rotational time period, a current circumference of the tire; and determine, in dependence upon at least the current circumference, a tread wear value.

In a particular embodiment, the memory (583) stores an application (584) embodied in computer-readable instructions that, when executed by the controller (581) cause the controller to receive, from the tire monitoring sensor (TMS), tread wear data including at least a rotational time period; determine, in dependence upon at least the rotational time period, a current circumference of the tire; and determine, in dependence upon at least the current circumference, a tread wear value. For example, the rotational time period may be determined, in part, from a linear velocity obtained via the GPS receiver (591). The application (584) may also cause the tread wear value to be displayed on the display (598).

Figure 6:
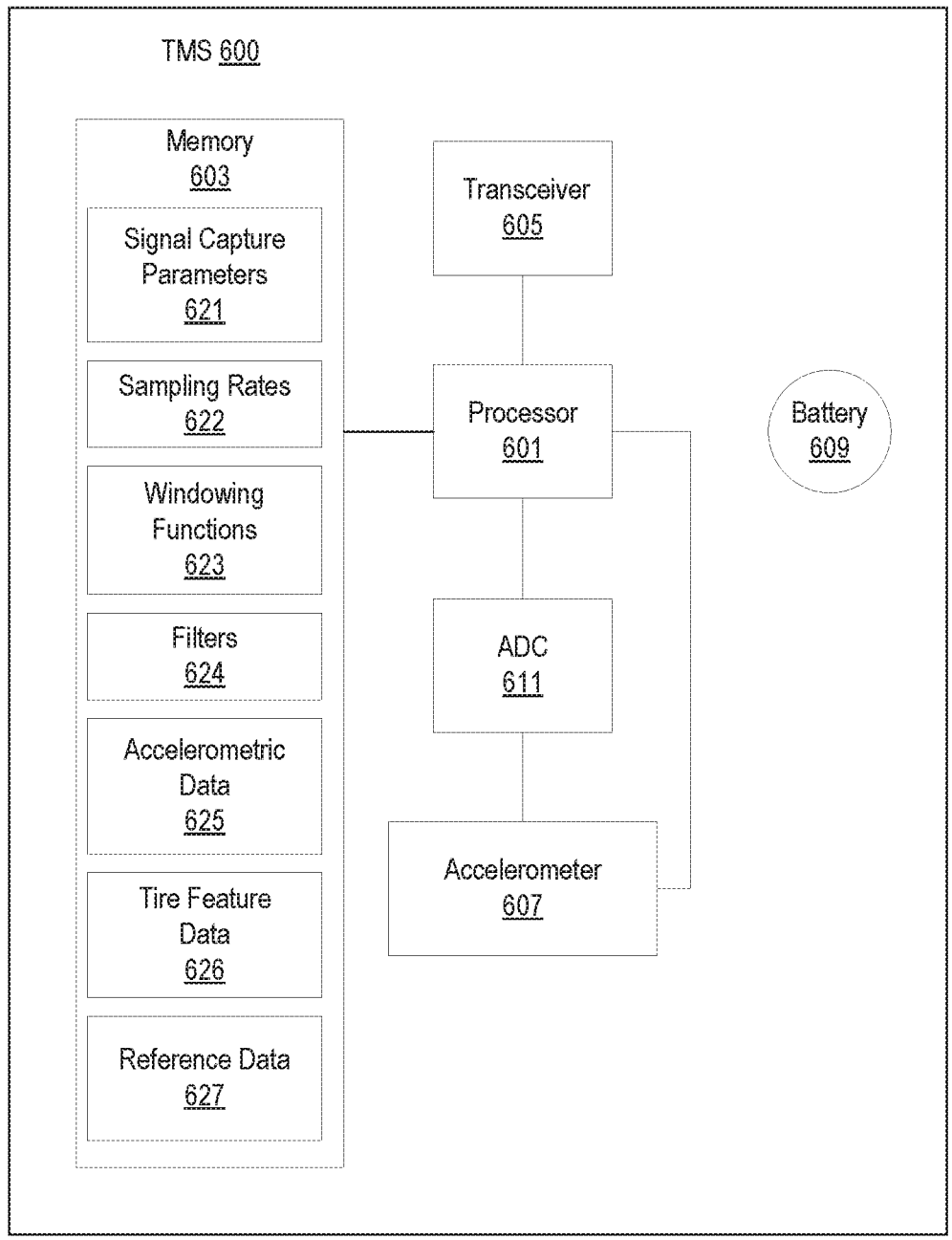
FIG. 6 illustrates a block diagram of an exemplary tire monitoring sensor in accordance with the present disclosure.

For further explanation, FIG. 6 sets forth a diagram of an exemplary tire monitoring sensor (TMS) (600) for determining tread depth according to embodiments of the present disclosure. The TMS (600) includes a processor (601). The processor may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure.

The TMS (600) of FIG. 6 also includes a memory (603) coupled to the processor (601). The memory may store signal capture parameters (621) such as the particular number of revolutions to measure the rotational time period, which may be determined by the processor (601), programmed into the memory (603), or received from the VCS (400) or the TCU (500). The memory (603) may store a sampling rates table (622) of sampling rates at which the ADC (611) sampled accelerometric signals data from the accelerometer (607). The processor (601) may configure the ADC (611) in accordance with a stored sampling rate. The memory (603) may also store a windowing function table (623) of windowing functions for identifying a rotational period of the tire from accelerometric data. The memory (603) may also store a filter table (624) of filter frequency bands with which to filter an accelerometric waveform. The memory (603) may also store accelerometric data (625), including a raw digital signal sampled from the accelerometer (607) by the ADC (611) and a processed accelerometric waveform processed by the processor (601). The memory (603) may also store tire data (626), such as a TMS identifier, a tire identifier (e.g., manufacturer make and model), manufacturer specifications for tire dimension (e.g., radius, circumference, width, aspect ratio, tread depth), a tire stiffness parameter, a tire mass parameter, and the like. The memory (603) may also store reference data (627) such as a reference circumference, a reference radius, and/or a reference tread depth received from the VCS (400) or the TCU (500) after an initial measurement of the tire when the tire is in a substantially original condition (i.e., when the tire is new).

For bidirectional wireless communication with the VCS (400), the TMS (600) of FIG. 6 includes a transceiver (605) coupled to the processor (601). In one embodiment, the transceiver (605) is a Bluetooth Low Energy transmitter-receiver. In other embodiments, the transceiver (605) may be other types of low energy bidirectional communication technology that is intended to conserve energy consumed in the TMS (600). The TMS (600) may transmit tread wear data such as a rotational time period, number of revolutions measured for the rotational time period, and reference data to the VCS (400) or TCU (500) via the transceiver (605). In an alternative embodiment, the TMS (600) includes a unidirectional transmitter configured to transmit data to the VCS (400) or the TCU (500).

The accelerometer (607) of FIG. 6 may also be an acceleration sensor, an accelerometric device, a shock sensor, a force sensor, a microelectromechanical systems (MEMs) sensor, or other device that is similarly responsive to acceleration magnitude and/or to changes in acceleration, such that a tire revolution may be determined from the time between detected ground strike events. For example, an accelerometer senses acceleration in the radial plane (z-plane), lateral plane (y-plane), and/or tangential plane (x-plane), and outputs an electric pulse signal responsive to sensed acceleration, including but not limited to signals indicative of ground strikes. In an embodiment, the accelerometer (607) is configurable with an accelerometer range, a wheel speed parameter, or other vehicle parameter provided by the VCS (400). For example, g-offset can be determined via wheel speed sensor or another vehicle parameter and used to capture and process signals faster. Accelerometers may have a selectable range of forces they can measure. These ranges can vary from ±1 g up to ±700 g. An example range of an accelerometer is ±200 g. The accelerometer range may be configured based on wheel speed, for example, ±150 g at a low speed, ±250 g at a medium speed, and ±500 g at a high speed. Typically, the smaller the range, the more sensitive the readings will be from the accelerometer.

The TMS (600) of FIG. 6 also includes an analog to digital converter (ADC) (611) that receives the electric pulse signals from the accelerometer (607) and sampled accelerometric signals them according to a sampling rate. The ADC (611) converts the raw analog signals received from the accelerometer (607) into a raw digital signal that is suitable for digital signal processing.

The TMS (600) of FIG. 6 also includes a battery (609) connected to a power bus (not shown) to power the transceiver (605), the processor (601), the ADC (611), the accelerometer (607), and the memory (603). The TMS (600) may be powered by other sources alternative to or in addition to the battery (609), such as an energy harvester or other power source.

In some embodiments, the TMS (600) may be configured to generate tread wear data while driving. For example, the TMS (600) may determine tread wear data including the rotational time period for the particular number of revolutions based on data from the accelerometer (607). In this example, an accelerometric waveform is generated from raw accelerometric data, and the rotational time period can be expressed as the number of sampled accelerometric signals between accelerometric waveform peaks divided by the sampling frequency. For example, the processor (601) can determine the number of sampled accelerometric signals between entry area peaks for the particular number of revolutions and divide the number of sampled accelerometric signals by the sampling frequency, to determine the rotational time period. The processor (601) can also collect other data relevant to tread wear, such as tire pressure, tire temperature, tire stiffness, etc. For example, the controller (601) can calculate these other factors from sensors in the TMS. In a particular embodiment, the TMS acts as a tire pressure monitoring system (TPMS) sensor that is configured to provide tire pressure parameters and tire temperature parameters to a tire pressure monitoring system (TPMS). In another embodiment, the TMS is configured to receive data indicating tire parameters (e.g., tire pressure, tire temperature, tire stiffness) from the VCS (400) as measured by other sensors (417) of the VCS (400) or receive data indicating the tire parameters from other sensors (e.g., valve-mounted tire pressure sensors, etc.).

Although the calculation of rotational time period is described as being determined by the processor (601) of the TMS (600), it is understood that the calculations and determinations set forth above may be performed at least in part by the VCS (400) and provided to the TMS (600). Moreover, it is understood that peak radial displacement or another tire deformation may also be calculated and used to determine tire load. Furthermore, although the TMS (600) is discussed interacting with a VCS (400), it is understood that similar functionality may be achieved by communicating with a TCU (500). Still further, it is understood that the TMS (600) may calculate tire circumference as set forth above when the linear velocity is provided to the TMS (600) from the VCS (400) or the TCU (500).

Figure 7:
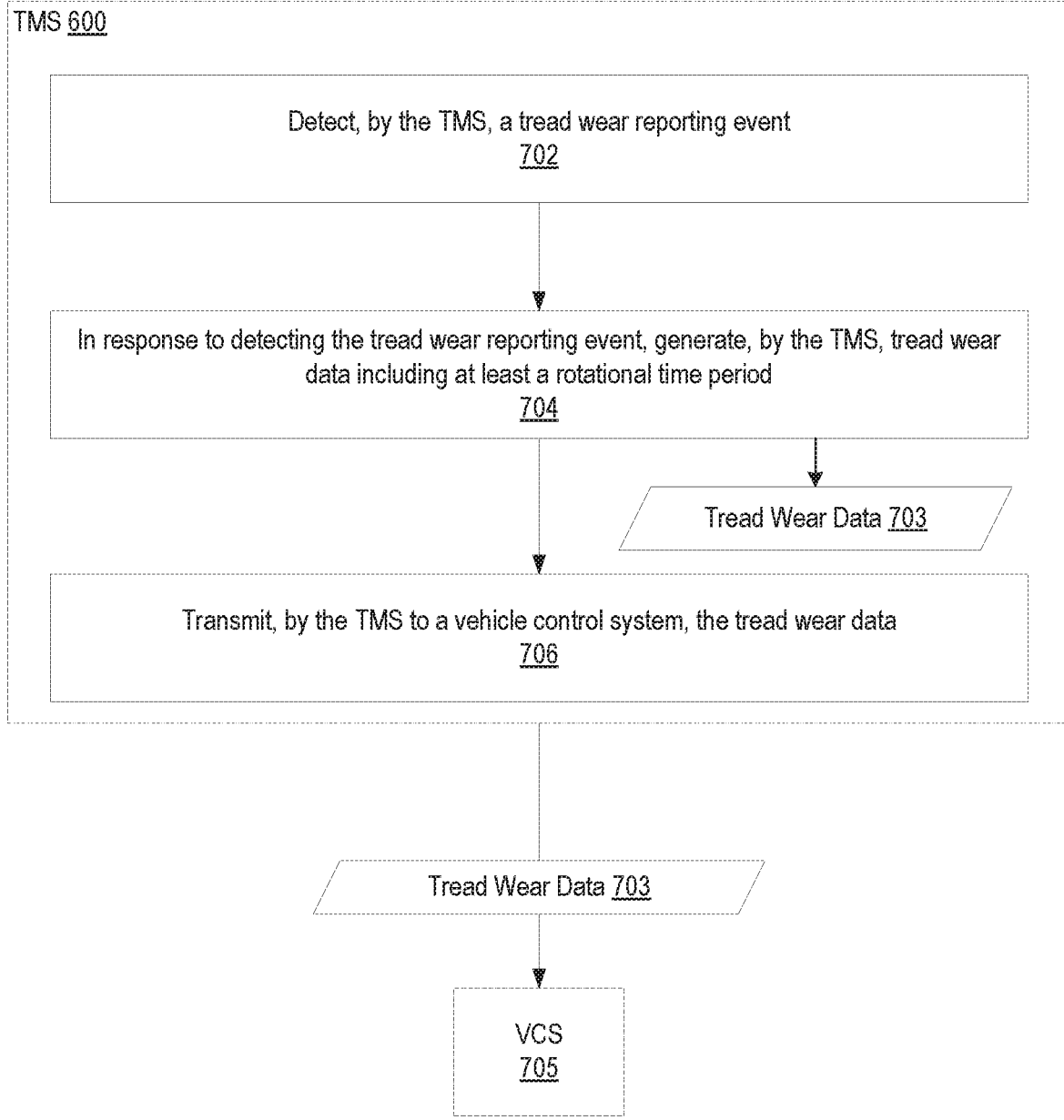
FIG. 7 sets forth a flowchart of an example method for enhanced tracking of tire tread wear in accordance with the present disclosure.

For further explanation, FIG. 7 sets forth a flow chart illustrating an exemplary method for enhanced tracking of tire tread wear according to embodiments of the present disclosure that includes detecting (702), by the tire monitoring sensor (TMS) (600), a tread wear reporting event. Detecting (702), by the TMS, a tread wear reporting event may be carried out by the TMS (600) determining that tread wear reporting data should be transmitted to a vehicle control system (VCS) (705) (e.g., the VCS (400) of FIG. 4 or the TCU (500) of FIG. 5A or the smart device (580) of FIG. 5B) that disposed within the vehicle (i.e., external to the TMS (600)). The tread wear data provided to the vehicle control system is data that is used by the controller to calculate a tread wear value or otherwise estimate the current tread depth and/or tread wear of the tire. For example, tread wear data includes measurement data generated by the TMS such as a measured length of time, or time period, that it takes for the tire to complete a particular number of revolutions; raw accelerometric data measured by the accelerometer (607); tire pressure; tire temperature; and other such measurements that will be appreciated by those of skill in the art. As another example, tread wear data includes data stored in the TMS such as to a sensor identifier (e.g., used by the controller to map tread wear data to tire location), a tire identifier (e.g., a serial number, make/model number, etc.), tire dimensions (e.g., diameter, radius, width, aspect ratio, original circumference, etc.), tire stiffness, and other such parameters that will be appreciated by those of skill in the art.

In one embodiment, the tread wear reporting event is based on a reporting schedule, in that detecting (702) the tread wear reporting event may be carried out by the TMS (600) determining that tread wear reporting data is due to be transmitted based on detecting a scheduled event. For example, a scheduled event may be based on a particular number of journeys completed by the tire. In such an example, a new journey may begin each time the vehicle is started and an initialization signal is received from the VCS (705) (e.g., the VCS (400) of FIG. 4 or the TCU (500) of FIG. 5A or the smart device (580) of FIG. 5B). In another embodiment, detecting (702) the tread wear reporting event may be carried out by the TMS (600) receiving a signal, via the transceiver (605), from the VCS (705), indicating that tread wear data should be reported. In one example, the signal may be a wake-up signal transmitted by the vehicle control system. In another example, the signal may include a message requesting tread wear reporting data.

The method of FIG. 7 also includes in response to detecting the tread wear reporting event, generating (704), by the TMS (600), tread wear data (703) for the tire, the tread wear data including at least a rotational time period. The rotational time period may include a measure of time that the tire takes to complete a particular number of revolutions. Generating (704), by the TMS (600), tread wear data (703) including rotational time period may be carried out by the TMS (600) identifying a particular number of revolutions of the tire from accelerometric data obtained from the accelerometer (607) and measuring the amount of time the tire takes to complete the particular number of revolutions. In one example, accelerometric data is obtained from the accelerometer (607) during a processing cycle, i.e., a window of time in which the accelerometer generates accelerometric data. To conserve battery charge and operational resources, the accelerometer only generates data received by the processor (601) of the TMS (600) during the processing cycle, which may be determined by the processor (601). The processor (601) may determine the particular number of revolutions for measuring the rotational time period based on the quality the data received during the processing cycle (e.g., based on the number of revolutions in a sequence of consistently identifiable revolutions). In another example, the particular number of revolutions to measure is received in a transmission from the VCS (705). In yet another example, the particular number of revolutions to measure is fixed and stored in the memory (603) of the TMS (600) as a signal capture parameter (621). The particular number of revolutions used for measuring the rotational period may be communicated to the VCS (705) or may be predetermined such that the VCS (705) is aware of the number of revolutions being used for calculating the rotational period.

By way of example and not limitation, the particular number of revolutions used to measure the rotational time period may be fixed at 10 revolutions, thus the rotational time period is the length of time the tire takes to complete 10 revolutions. Based on the accelerometric data received from the accelerometer (607), the processor (601) identifies a sequence of road strike events (i.e., tire contact with the road) that indicate completed revolutions of the tire and measures the length of time taken for the tire to complete 10 road strike events (i.e., revolutions). For example, the processor (601) may determine, from accelerometric data received from the accelerometer (607) that the tire takes 10.993 seconds (s) to complete 10 revolutions. Using methodology described in more detail below, the VCS (705) uses the rotational time period of 10.993 s along with a linear speed of the vehicle or tire to calculate the present circumference of the tire, which is then used to calculate a value for the current tread depth. In another example, the processor (601) may receive a vehicle-provided speed parameter, which the processor (601) uses along with the rotational time period and quantity of revolutions to calculate the present circumference of the tire. In this example, the tread wear data includes the present circumference of the tire. In a further example, the processor (601), based the calculated present circumference of the tire and stored tire dimension information, calculates a tread wear value. In this example, the tread wear data includes the calculated tread wear value.

The method of FIG. 7 also includes transmitting (706), by the TMS (600) to a vehicle control system, the tread wear data (703) including the rotational time period. Transmitting (706), by the TMS (600) to a vehicle control system, the tread wear data (703) including the rotational time period may be carried out by the transceiver (605) of the TMS (600) transmitting the tread wear data, including at least the measure of time that the tire takes to complete a particular number of revolutions, to the VCS (705). The processor (601), via the transceiver (605), may also transmit other types of tread wear data previously discussed. The other types of tread wear data may be transmitted in the same transmission frame as the rotational time period or in separate transmissions. In a particular example, the TMS (600) transmits the rotational time period. (e.g. 10.993 s) and the number of revolutions in the rotational time period (e.g. 10) in the same transmission frame. In other embodiments, the number of revolutions with which to measure the rotational time period may be stored as a fixed parameter in the memory (603) of the TMS and also known by the VCS (705). In yet another embodiment, the TMS (600) receives the number of revolutions with which to measure the rotational time period from the VCS (705). In yet another embodiment, the TMS (600) divides the rotational time period by the number of revolutions and reports a rotational time period for one revolution.

Figure 8:
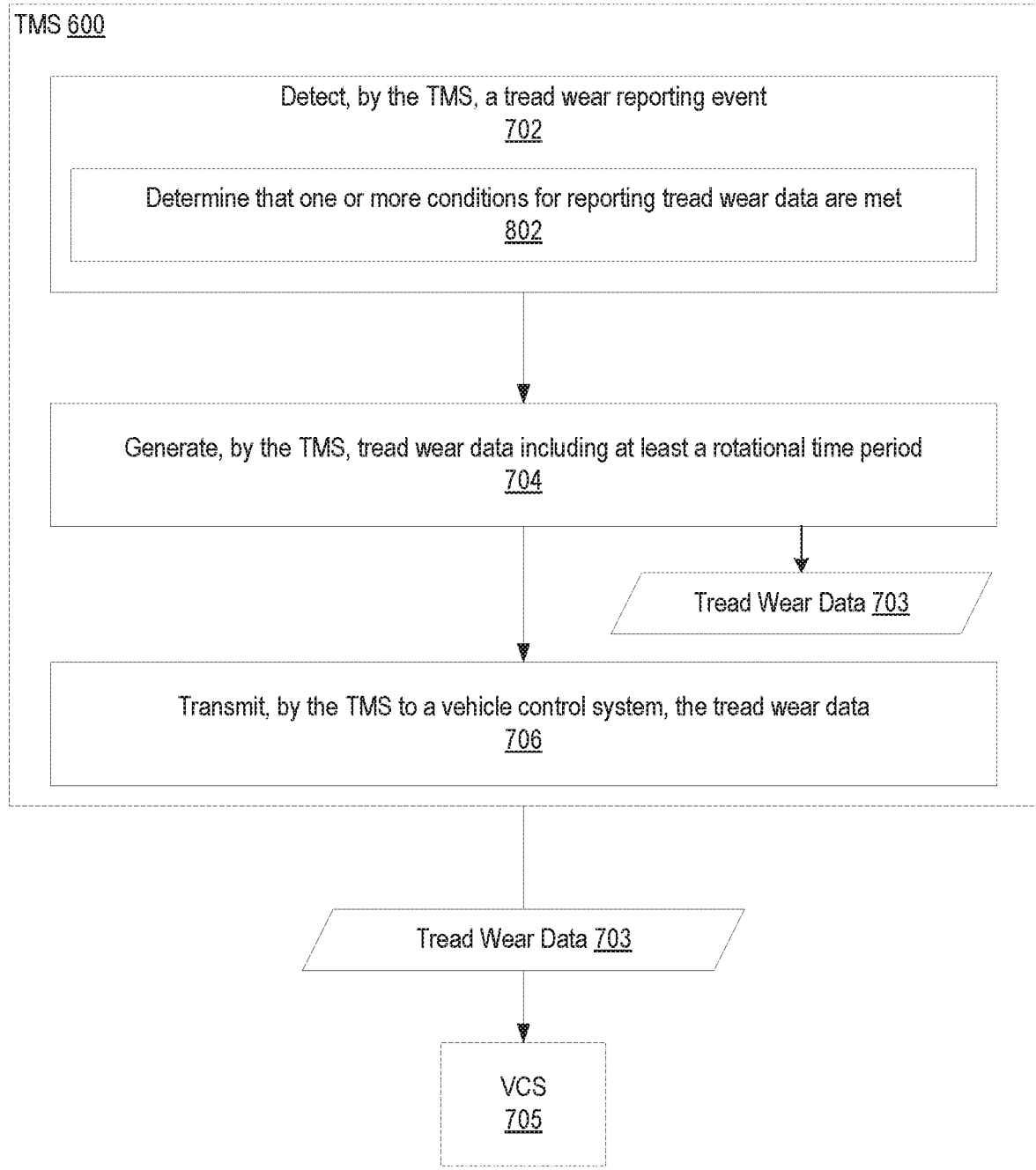
FIG. 8 sets forth a flowchart of another example method for enhanced tracking of tire tread wear in accordance with the present disclosure.

For further explanation, FIG. 8 sets forth a flow chart illustrating an exemplary method for enhanced tracking of tire tread wear according to embodiments of the present disclosure. Like the method of FIG. 7, the method of FIG. 8 also includes detecting (702), by the tire monitoring sensor (TMS), a tread wear reporting event; includes in response to detecting the tread wear reporting event, generating (704), by the TMS (600), tread wear data (703) for the tire, the tread wear data including at least a rotational time period; and transmitting (706), by the TMS to a vehicle control system, the tread wear data.

The method of FIG. 8 differs from the method of FIG. 7 in that detecting (702), by the tire monitoring sensor (TMS), a tread wear reporting event includes determining (802) that one or more conditions for reporting tread wear data are met. Determining (802) that one or more conditions for reporting tread wear data are met may be carried out by the processor (601) of the TMS (600) determining that one or more conditions for reporting tread wear data to the VCS (705) have been met. For example, the processor (601) may report tread wear data based on the number of journeys completed by the tire. In this example, the processor (601) may maintain a reporting schedule by tracking the number of journeys since tread wear data was last reported. A journey may be expressed as the number of times the tire has started and stopped, the number of times the vehicle has been turned on and off, and other similar events that will be appreciated by those of skill in the art. In this example, the TMS (600) maintains a counter for computing the number of journeys. In another example, the TMS (600) reports tread wear based on a periodic schedule, for example, based on a relative time since the TMS was first initialized or an absolute time. A reporting schedule based on the number of journeys, a relative time, or an absolute time may be programmed in the memory (603) of the TMS (600). As another example in a bidirectional communication system, a condition for reporting tread wear data may include receiving a request signal from the VCS (705), such that the condition is met when that signal is received. The VCS (705) may be a vehicle control unit, an after-market system, or diagnostic tool such as a handheld system.

Figure 9:
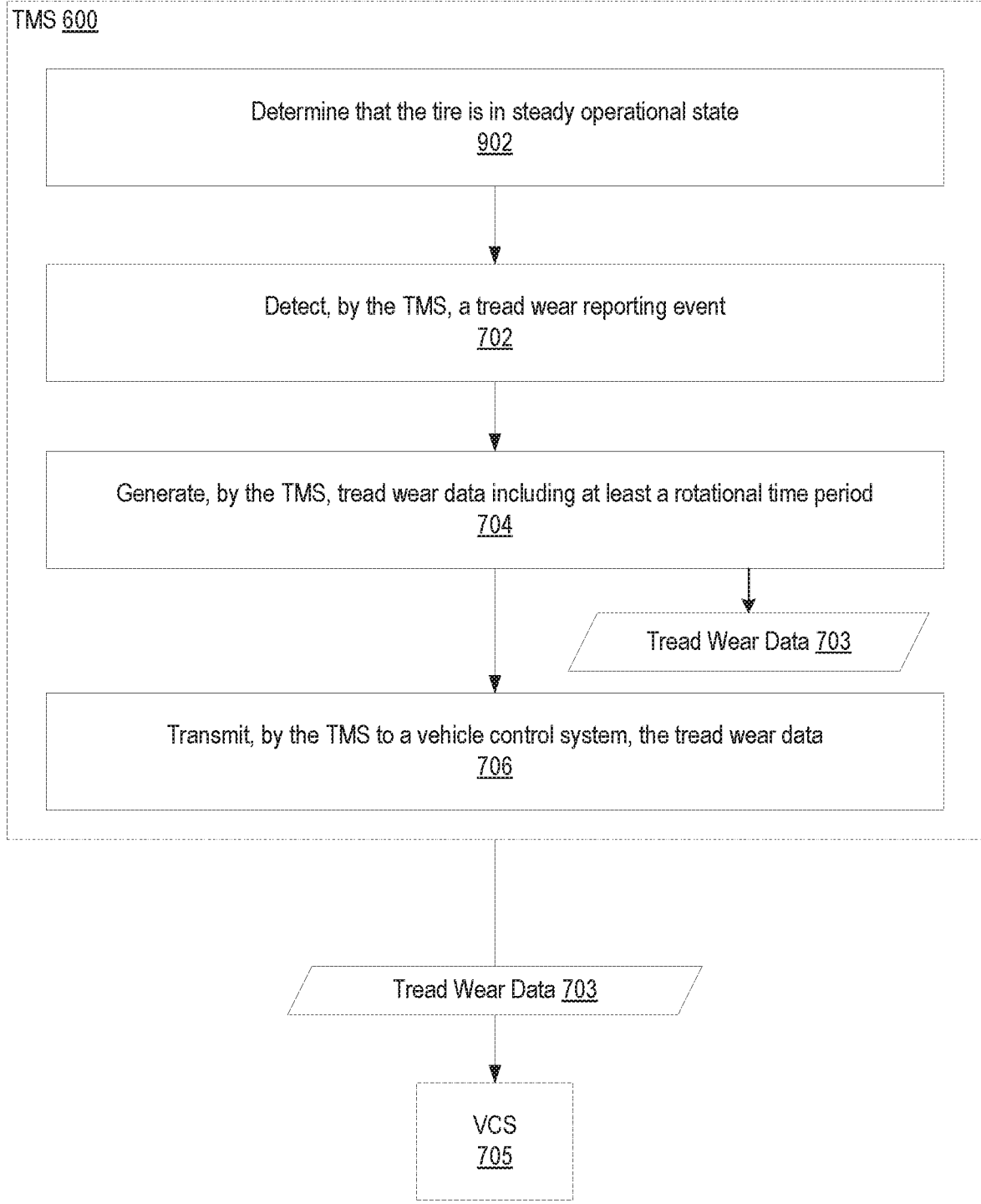
FIG. 9 sets forth a flowchart of another example method for enhanced tracking of tire tread wear in accordance with the present disclosure.

For further explanation, FIG. 9 sets forth a flow chart illustrating an exemplary method for enhanced tracking of tire tread wear according to embodiments of the present disclosure. Like the method of FIG. 7, the method of FIG. 9 also includes detecting (702), by the TMS, a tread wear reporting event; generating (704), by the TMS, tread wear data including at least the rotational time period; and transmitting (706), by the TMS to the vehicle control system, the tread wear data.

The method of FIG. 9 differs from the method of FIG. 7 in that the method of FIG. 9 further comprises prior to generating (704) tread wear data (703), determining (902) that the tire is in a steady operational state. Determining (902) that the tire is in a steady operational state may be carried out by the processor (601) determining, from sensor data and parameters derived from sensor data, that the tire and/or vehicle is operating in a steady state. For example, the sensor data may include accelerometric data used to determine that the tire is not accelerating or decelerating. Parameters derived from sensor data may include tire load, peak radial deformation, and/or contact patch length that are derived from the accelerometric data. Other types of sensor data may include tire temperature and tire pressure as measured from temperature and pressure sensors. The processor (601) determines that the tire is in a steady state by comparing the sensor data and parameters to corresponding thresholds. Once the processor (601) determines (902) that the tire is operating in a steady state within the thresholds, the processor may then generate (704) the tread wear data including the rotational time period.

Figure 10:
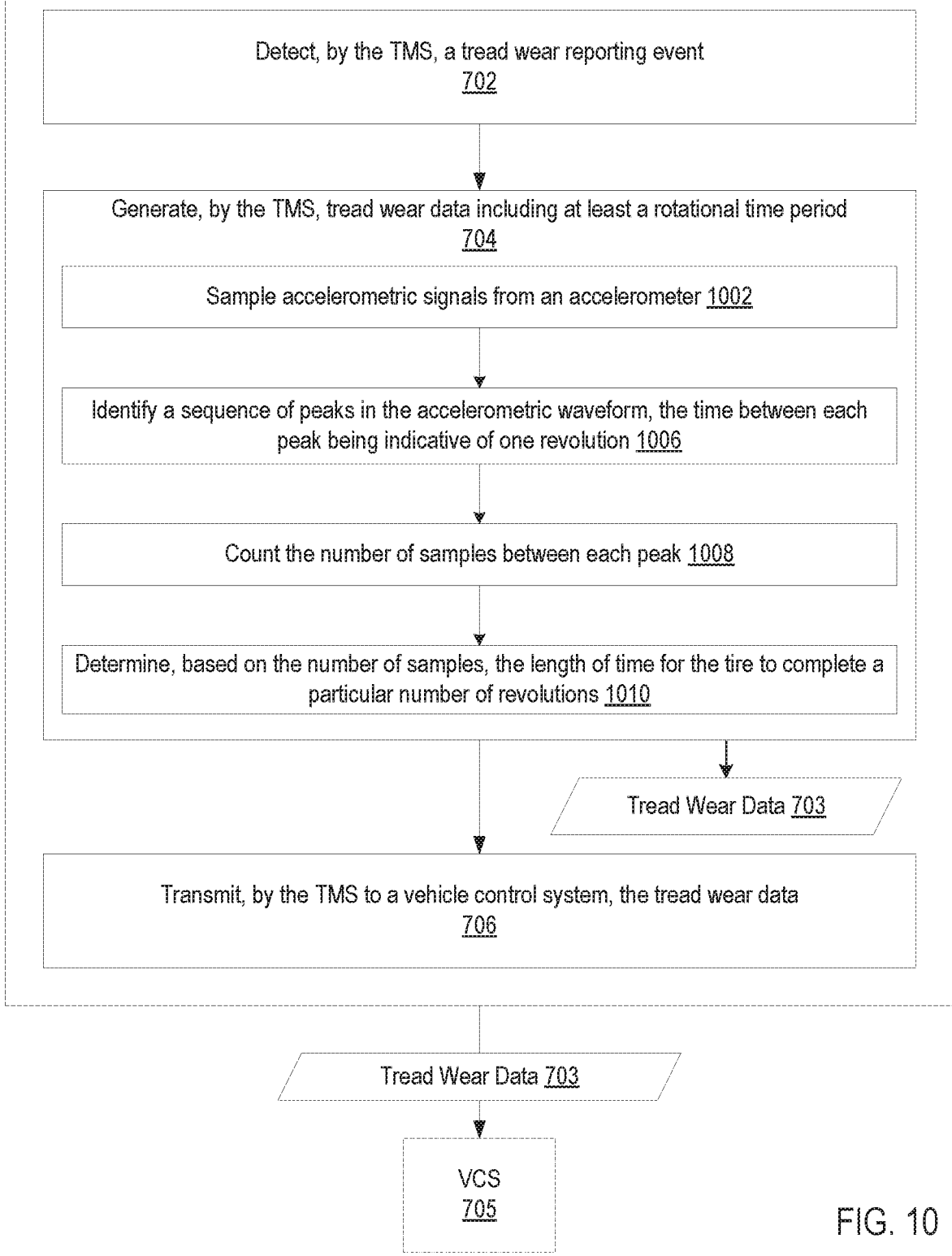
FIG. 10 sets forth a flowchart of another example method for enhanced tracking of tire tread wear in accordance with the present disclosure.

For further explanation, FIG. 10 sets forth a flow chart illustrating an exemplary method for enhanced tracking of tire tread wear according to embodiments of the present disclosure. Like the method of FIG. 7, the method of FIG. 10 also includes detecting (702), by the TMS, a tread wear reporting event; includes in response to detecting the tread wear reporting event, generating (704), by the TMS (600), tread wear data (703) for the tire, the tread wear data including at least a rotational time period; transmitting (706), by the TMS to a vehicle control system, the tread wear data.

The method of FIG. 10 differs from the method of FIG. 7 in that generating (704), by the TMS (600), tread wear data (703) includes sampling (1002) accelerometric signals from an accelerometer. Sampling (1002) accelerometric signals from an accelerometer may be carried out by the ADC (611) receiving electric pulse signals from the accelerometer (607) and sampling them according to a sampling rate (e.g., 10 KHz). The ADC (611) converts the raw analog signals received from the accelerometer (607) into a raw digital signal that is suitable for digital signal processing by the processor (601).

In some examples, the processor (601) may generate a raw accelerometric waveform profile from the raw accelerometric data received form the ADC (611), apply a windowing function to isolate individual road strikes, invert and zero the signal, and filter the windowed waveform to remove noise.

The method of FIG. 10 also differs from the method of FIG. 7 in that generating (704), by the TMS (600), tread wear data (703) further includes identifying (1006) a sequence of peaks in the accelerometric waveform, with each peak being indicative of one revolution. Identifying (1006) a sequence of peaks in the accelerometric waveform may be carried out by the processor (601) identifying a sequence of peaks in the waveform that are within thresholds (e.g., a g-force metric), and determining that the number of sampled accelerometric signals between each peak is within a moving average threshold. Each peak represents the start of a new revolution and the end of the previous revolution. A peak may be an entry area peak or an exit area peak where the g-force is highest, or a contact area peak whether the g-force is at or near zero. A sequence of peaks is selected such that each peak indicates the same event (i.e., either road strike entry, ground contact, or road strike exit). For measuring the rotational time period, the sequence of peaks includes at least N+1 peaks, where N is a particular number of revolutions for which the rotational time period is measured.

The method of FIG. 10 also differs from the method of FIG. 7 in that generating (704), by the TMS (600), tread wear data (703) including at least a rotational time period further includes counting (1008) the number of sampled accelerometric signals between each peak. Counting (1008) the number of sampled accelerometric signals between each peak may be carried out by the processor determining the number sampled accelerometric signals between the first peak and last peak of the sequence of selected peaks. For example, if the particular number of revolutions for which the rotation time period is 10 revolutions, the number of sampled accelerometric signals between 11 peaks is counted to determine the number of sampled accelerometric signals for 10 revolutions of the tire.

The method of FIG. 10 also differs from the method of FIG. 7 in that generating (704), by the TMS (600), tread wear data (703) further includes determining (1010), based on the number of sampled accelerometric signals, the length of time for the tire to complete a particular number of revolutions. Determining (1010), based on the number of sampled accelerometric signals, the length of time for the tire to complete a particular number of revolutions may be carried out by the processor (601) dividing the number of sampled accelerometric signals counted by the sampling frequency. As a simple example, if 100,000 sampled accelerometric signals are counted between 11 peaks (representing 10 revolutions of the tire), and if the sampling rate is 10 KHz, then the rotational time period is 10 seconds for 10 revolutions of the tire.

Figure 11A:
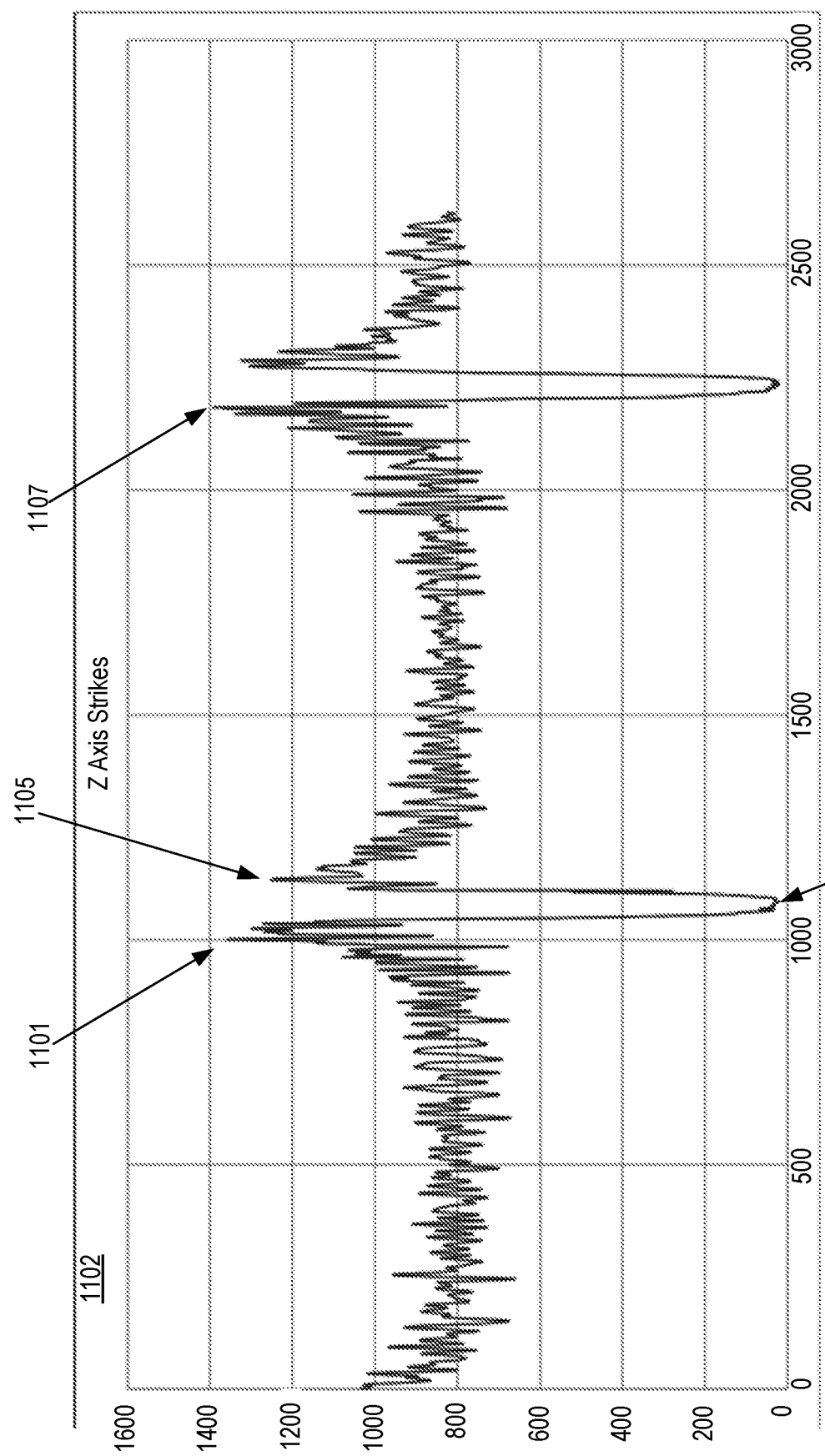
FIG. 11A illustrates a sample accelerometric waveform of signals obtained from an accelerometer measuring Z-plane acceleration.

For further explanation, FIG. 11A illustrates a sample accelerometric waveform (1102) of signals obtained from an accelerometer measuring Z-plane acceleration, where the y-axis is g-force and the x-axis is sample number. In FIG. 11A, an entry area peak (1101), contact area peak (1103), and exit area peak (1105) represent a road strike. Each road strike represents the end of one revolution and the beginning of a new revolution. A revolution may be measured based on the time between successive reference peaks of the same type (e.g., entry peak to entry peaks, contact peak to contact peak, or exit peak to exit peak). For example, one revolution may be measured between the entry area peak (1101) and the next entry area peak (1107). The rotational time period for one revolution may be calculated by counting the number of sampled accelerometric signals between the first entry area peak (1101) and the next entry area peak (1107), and dividing the number of sampled accelerometric signals by the sampling frequency.

Figure 11B:
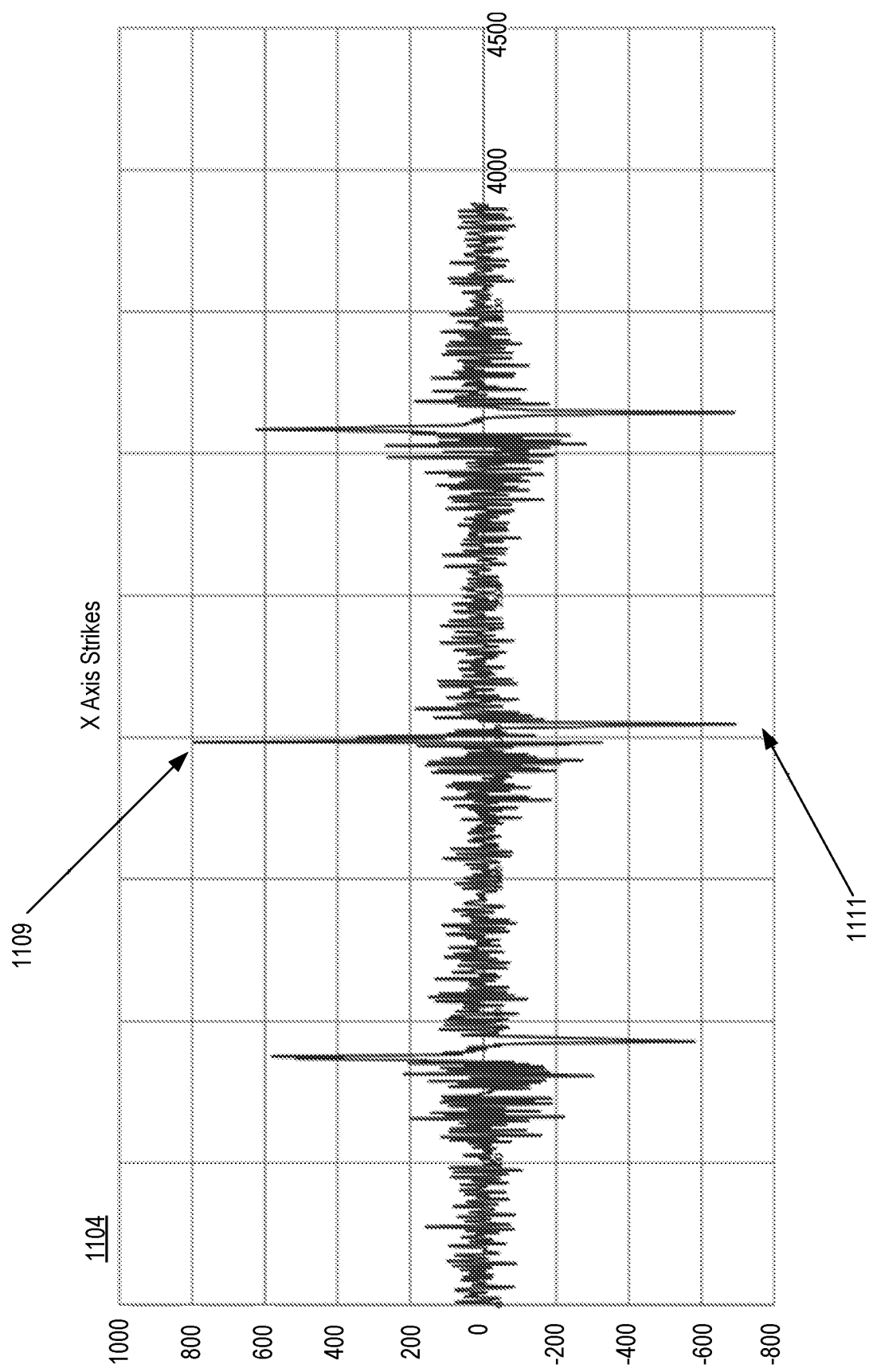
FIG. 11B illustrates a sample accelerometric waveform of signals obtained from an accelerometer measuring X-plane acceleration FIG. 12 sets forth a flowchart of an example method for enhanced tracking of tire tread wear in accordance with the present disclosure.

For further explanation, FIG. 11B illustrates a sample accelerometric waveform (1104) of signals obtained from an accelerometer measuring X-plane acceleration, where the y-axis is g-force and the x-axis is a sample number. FIG. 11B also illustrates entry area peaks (1109) and exit area peaks (1111).

Figure 12:
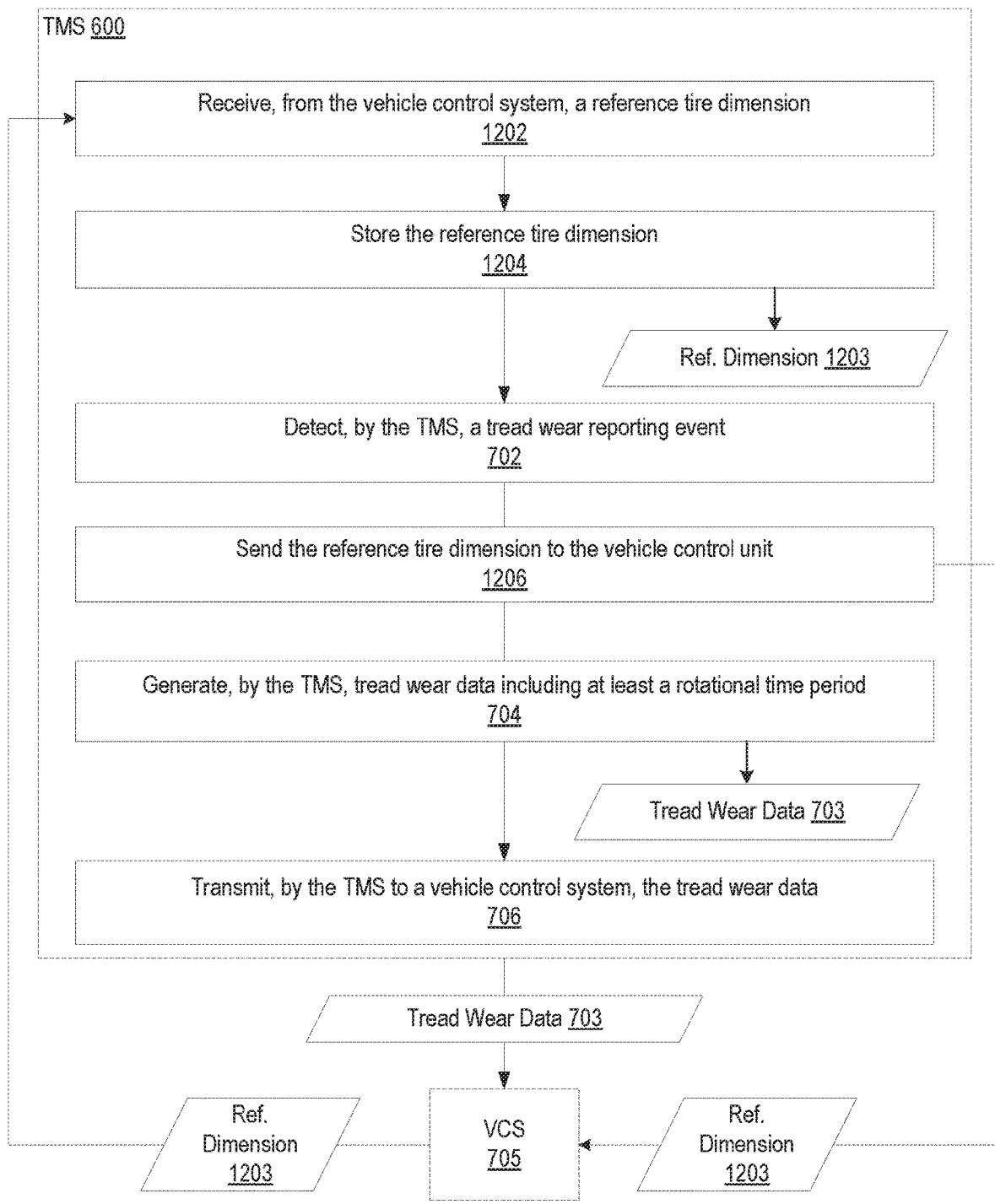

For further explanation, FIG. 12 sets forth a flow chart illustrating an exemplary method for enhanced tracking of tire tread wear according to embodiments of the present disclosure. Like the method of FIG. 7, the method of FIG.

12 also includes detecting (702), by the TMS, a tread wear reporting event; includes in response to detecting the tread wear reporting event, generating (704), by the TMS (600), tread wear data (703) for the tire, the tread wear data including at least a rotational time period; and transmitting (706), by the TMS to a vehicle control system, the tread wear data.

The method of FIG. 12 differs from the method of FIG. 7 in that the method of FIG. 12 includes receiving (1202), from the vehicle control system, a reference tire dimension. Receiving (1202), from the vehicle control system, a reference tire dimension may be carried out by the processor (601) of the TMS (600) receiving, via transceiver (605), a transmission that includes the reference tire dimension (1203) from the VCS (705). The reference tire dimension (1203) may be based on data previously collected by the TMS and transmitted to the VCS (705). For example, the previously collected and transmitted data includes rotational time period data for a predetermined number of journeys after the TMS (600) is first initialized with the VCS (705), which the VCS (705) uses to calculate the reference tire dimension. For example, the TMS (600) may be initialized with the VCS (705) after a first installation of the tire, either during assembly of the vehicle or a subsequent tire replacement. Initializing may be carried out by the VCS (705) detecting, for the first time, the TMS (600) based on a sensor identifier or by the TMS (600) detecting a signal from the VCS (705). For example, when the TMS (600) is a BLE-equipped sensor, the initialization may be carried out by pairing the TMS (600) with the VCS (705). A fixed number of journeys may be established for calculating the reference tire dimension. For example, the TMS (600) may collect and transmit rotational time period data for N number of journeys after the TMS (600) has been initialized (e.g., paired) with the VCS (705). The external control may then calculate a circumference of the tire based on the average rotational time period for the N number of journeys, which is then used to establish the reference tire dimension. For example, the reference tire dimension may be the circumference, diameter, or radius of the tire based on the rotational time period data collected after N number of journeys. In a particular embodiment, the reference tire dimension is a reference radius. The VCS (705) may transmit the reference tire dimension to by the TMS (600).

The method of FIG. 12 also includes storing (1204) the reference tire dimension. Storing (1204) the reference tire dimension may be carried out by the processor (601) storing the received reference tire dimension in the memory (603) as reference data (627).

The method of FIG. 12 also includes sending (1206), upon detecting the tread wear reporting event, the reference tire dimension to the vehicle control system. Sending (1206), upon detecting the tread wear reporting event, the reference tire dimension to the vehicle control system may be carried out by the processor (601), via the transceiver (605), the reference tire dimension to the VCS (705). For example, upon detecting the tread wear reporting event, the TMS (600) may communicate the reference tire dimension to the VCS (705) for use in calculating the tread wear value. For example, the reference tire dimension may be transmitted at the start of a new journey, in response to a wake-up signal from the VCS (705), and/or as a constituent of the tread wear data. In this manner, the reference tire dimension may reside in the TMS (600) such that when the tire is removed from the vehicle and replaced at a later time, or when the tire is moved from one vehicle to a different vehicle, the VCS (705) may obtain the reference tire dimension data from the TMS (600). Because this reference tire dimension is calculated based on actual measurements of the tire, the calculated reference tire dimension data may be more accurate than manufacturer specifications that cannot account for variations from tire to tire.

Figure 13:
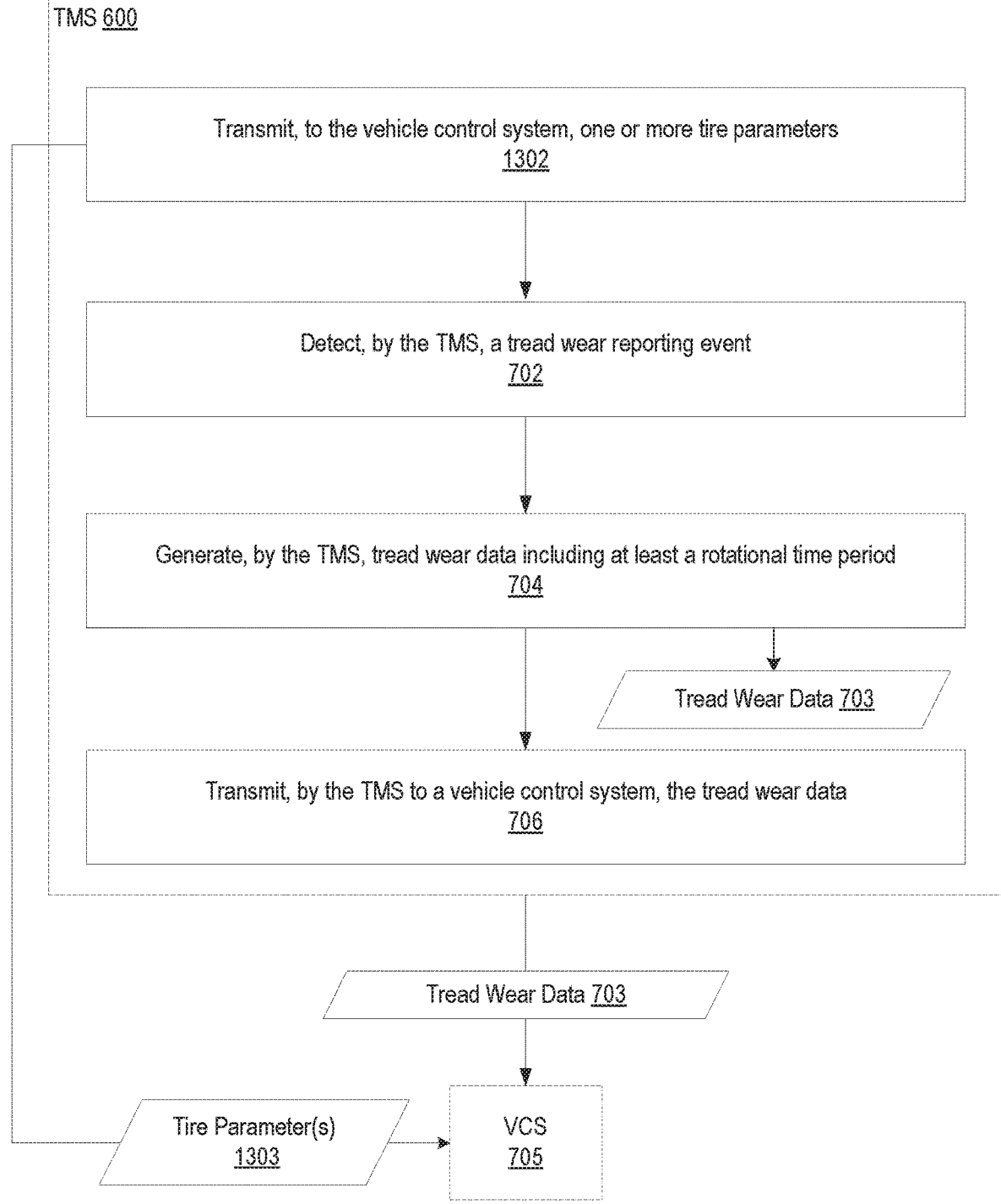
FIG. 13 sets forth a flowchart of another example method for enhanced tracking of tire tread wear in accordance with the present disclosure.

For further explanation, FIG. 13 sets forth a flow chart illustrating an exemplary method for enhanced tracking of tire tread wear according to embodiments of the present disclosure. Like the method of FIG. 7, the method of FIG. 13 also includes detecting (702), by the TMS, a tread wear reporting event; includes in response to detecting the tread wear reporting event, generating (704), by the TMS (600), tread wear data (703) for the tire, the tread wear data including at least a rotational time period; and transmitting (706), by the TMS to a vehicle control system, the tread wear data.

The method of FIG. 13 differs from the method of FIG. 7 in that the method of FIG. 13 further comprises transmitting (1302), to the vehicle control system, one or more tire parameters. Transmitting (1302), to the vehicle control system, one or more tire parameters may be carried out via the transceiver (605) of the TMS (600) transmitting one or more tire parameters (1303) to the VCS (705). The one or more tire parameters (1303) may include parameters that are programmed into the memory (603) of the TMS (600), such as but not limited to a TMS identifier, a tire identifier, a tire stiffness parameter, a tire mass parameter, and tire dimension data. The one or more tire parameters (1303) may include parameters that include sensor data such as but not limited to a tire temperature parameter from a temperature sensor, a tire pressure parameter from a pressure sensor, and an accelerometric parameter from an accelerometer. The one or more tire parameters (1303) may include parameters derived from sensor data such as but not limited to a tire load parameter, a peak radial deformation parameter, and/or a contact patch length parameter that are derived from the accelerometric data from the accelerometer. The one or more tire parameters (1303) may be transmitted as tread wear data in the same transmission frame as the rotational time period. The one or more parameters tire (1303) may also be transmitted before or after reporting the tread wear data including the rotational time period. For example, the TMS (600) may transmit, via the transceiver (605), a TMS identifier and tire identification information upon initialization of the TMS (600) with the VCS (705), for example, after the TMS (600) first detects motion after installation of the tire.

In a particular embodiment, the one or more tire parameters (1303) include at least a TMS identifier and a tire identifier. The VCS (705) may use the sensor identifier to determine the location of the tire on the vehicle (e.g., through a mapping maintained by the vehicle control system). The VCS (705) may use the tire identifier to determine (e.g., from a database or other data source) tire dimension characteristics as well as other tire characteristics such as tire stiffness. In another particular embodiment, the one or more parameters include the sensor identifier and tire dimension parameters that are programmed into the TMS upon installation. In this example, the TMS stores the original circumference, diameter, and/or radius of the tire (i.e., dimension parameters of a new tire), which are transmitted to the VCS (705) as a tire dimension parameter(s).

Figure 14:
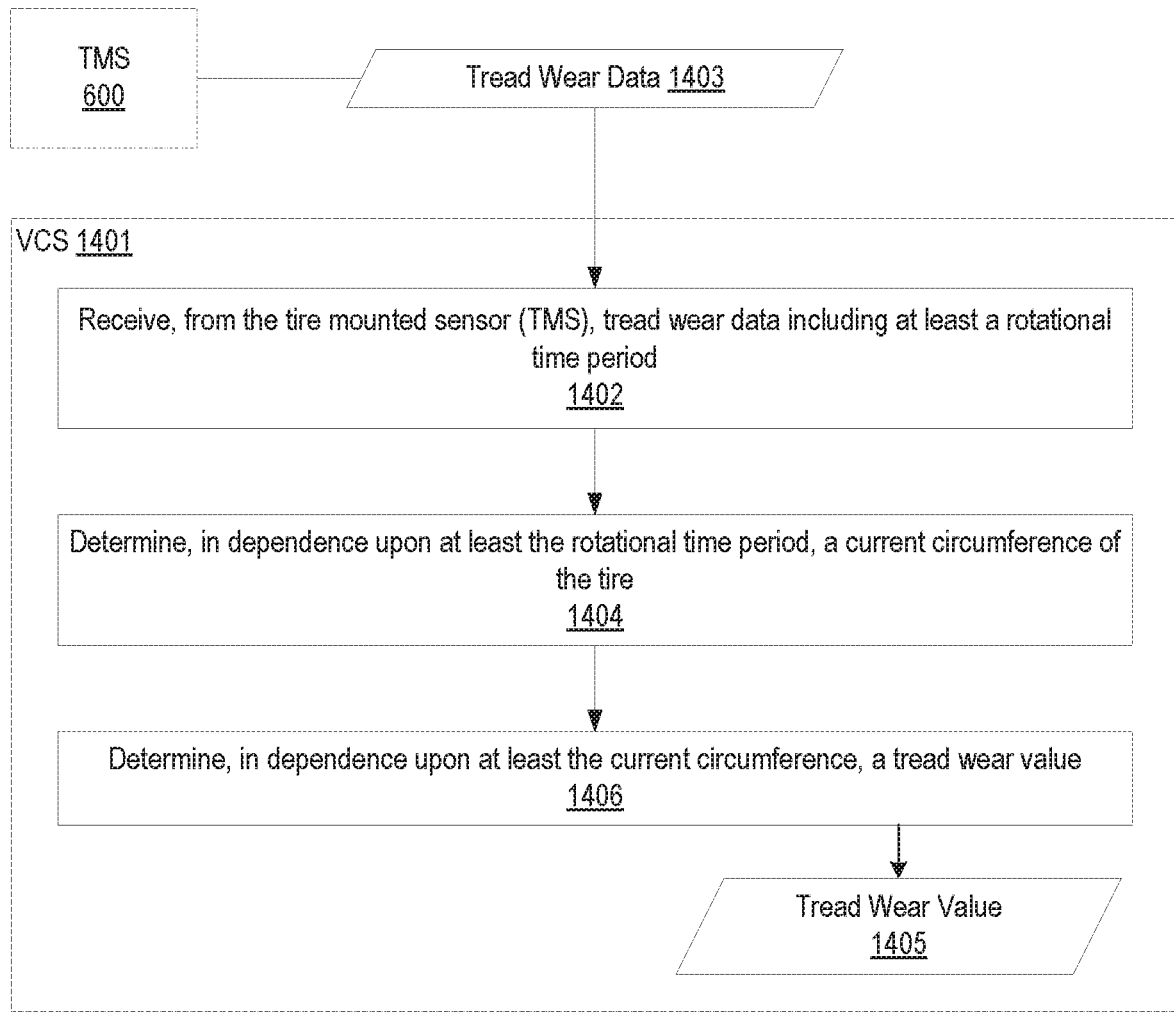
FIG. 14 sets forth a flowchart of another example method for enhanced tracking of tire tread wear in accordance with the present disclosure.

For further explanation, FIG. 14 sets forth a flow chart illustrating an exemplary method for enhanced tracking of tire tread wear according to embodiments of the present disclosure that includes receiving (1402), from the tire monitoring sensor (TMS) (600), tread wear data (1403) including at least a rotational time period. Receiving (1402), from the TMS (600), tread wear data (1403) including at least a rotational time period may be carried out by an vehicle control system (VCS) (1401) (e.g., by the controller (401) of a VCS (400) of FIG. 4, or by the controller (501) of a TCU (500) of FIG. 5A, or by the controller (581) of the smart device (580) of FIG. 5B) receiving tread wear data (1403) including at least the rotational time period. For example, a transmission from the TMS (600) may be received via a transceiver (e.g., the transceiver (405) of the VCS (400) or the transceiver (505) of the TCU (500), or by the transceiver (590) of the smart device (580)). The tread wear data (1403) includes at least a rotational time period and may include other data such as parameters used to calculate the rotational time period. In a particular embodiment, the rotational time period is a measure of time the tire takes to complete a particular number of revolutions, as determined by the TMS (600). In some embodiments, the tread wear data (1403) also indicates the particular number of revolutions measured to determine the rotational time period. In other embodiments, the particular number of revolutions measured to determine the rotational time period is predetermined before receiving (1402), from the TMS, the tread wear data (1403) including at least a rotational time period.

The method of FIG. 14 also includes determining (1404), in dependence upon at least the rotational time period, a current circumference of the tire. Determining (1404), in dependence upon at least the rotational time period, a current circumference of the tire may be carried out by the VCS (1401) calculating the current circumference of the tire (i.e., the circumference of the tire after some amount of use) based on at least the rotational time period. In a particular embodiment, the current circumference of the tire is derived from the rotational time period from the TMS, the number of revolutions of the tire during the rotational time period, and the linear velocity of the vehicle, as will be explained in detail below. In other embodiments, the current circumference of the tire is derived from the rotational time period from the TMS, the number of revolutions of the tire during the time period, and parameters from other vehicle subsystems such as information from a wheel speed sensor. However, it will be appreciated by those of skill in the art that some systems, such as an after-market telematics system, may not have access to vehicle subsystems such as those that could provide information from a wheel speed sensor. Therefore, the particular embodiment is advantageous in that linear velocity (and thus tire circumference) may be derived using an after-market navigation system without the need to access vehicle subsystems such as the vehicle-based GPS.

The method of FIG. 14 also includes determining (1406), in dependence upon at least the current circumference, a tire tread wear value (1405). Determining (1406), in dependence upon at least the current circumference, a tread wear value (1405) may be carried out by the VCS (1401) determining a tread wear value indicating a current or remaining tread depth, a tread depth relative to an original tread depth, and/or a relative reduction in tread based on at least the current circumference of the tire. In some embodiments, the tread wear value may be a pass/fail indication that the tread depth is above the threshold for a "worn tire;" that is, above the legal minimum tread depth (e.g., 1.6 mm or 0.0625 in). Various additional parameters such as reference values may be used in conjunction with the current circumference for deriving the tread wear value.

For example, the VCS (1401) may store a new tire circumference and compare the current circumference to the new tire circumference to determine a relative reduction in circumference for determining a tread wear value. As another example, the VCS (1401) may store a new tire diameter, calculate a current diameter of based on the current circumference, and compare the current diameter to the new tire diameter to determine a reduction in tread wear, either as a relative or absolute measurement. As yet another example, the VCS (1401) may store a new tire radius, calculate a current radius based on the current circumference, and compare the current radius to the new tire radius to determine a reduction in tread wear, either as a relative or an absolute measurement. Further, the VCS (1401) may store an original tread depth value and calculate a new tread depth value based on the reduction in tire circumference, diameter, or radius.

In some embodiments, the VCS determines, based on the current circumference, whether the current tread depth is above a threshold for a minimum depth. For example, the VCS (1401) may store a worn tire circumference and compare the current tire circumference to the worn tire circumference to determine whether the current tire tread depth is above a legal limit. The VCS (1401) may store a replacement tire circumference and compare the current tire circumference to the replacement tire circumference to determine whether the current circumference is above a circumference value recommended for tire replacement.

In some embodiments, the VCS (1401) outputs an indication of the tread wear value. For example, the VCS (1401) may output a signal that causes a vehicle dashboard or display screen to indicate the tread wear value and/or whether a tire should be replaced for insufficient tread depth. The indication may also include a warning that the tread depth on a particular tire is approaching a limit. The VCS (1401) may also output the tread wear value to a diagnostic tool or a diagnostic application on a computing device.

Figure 15:
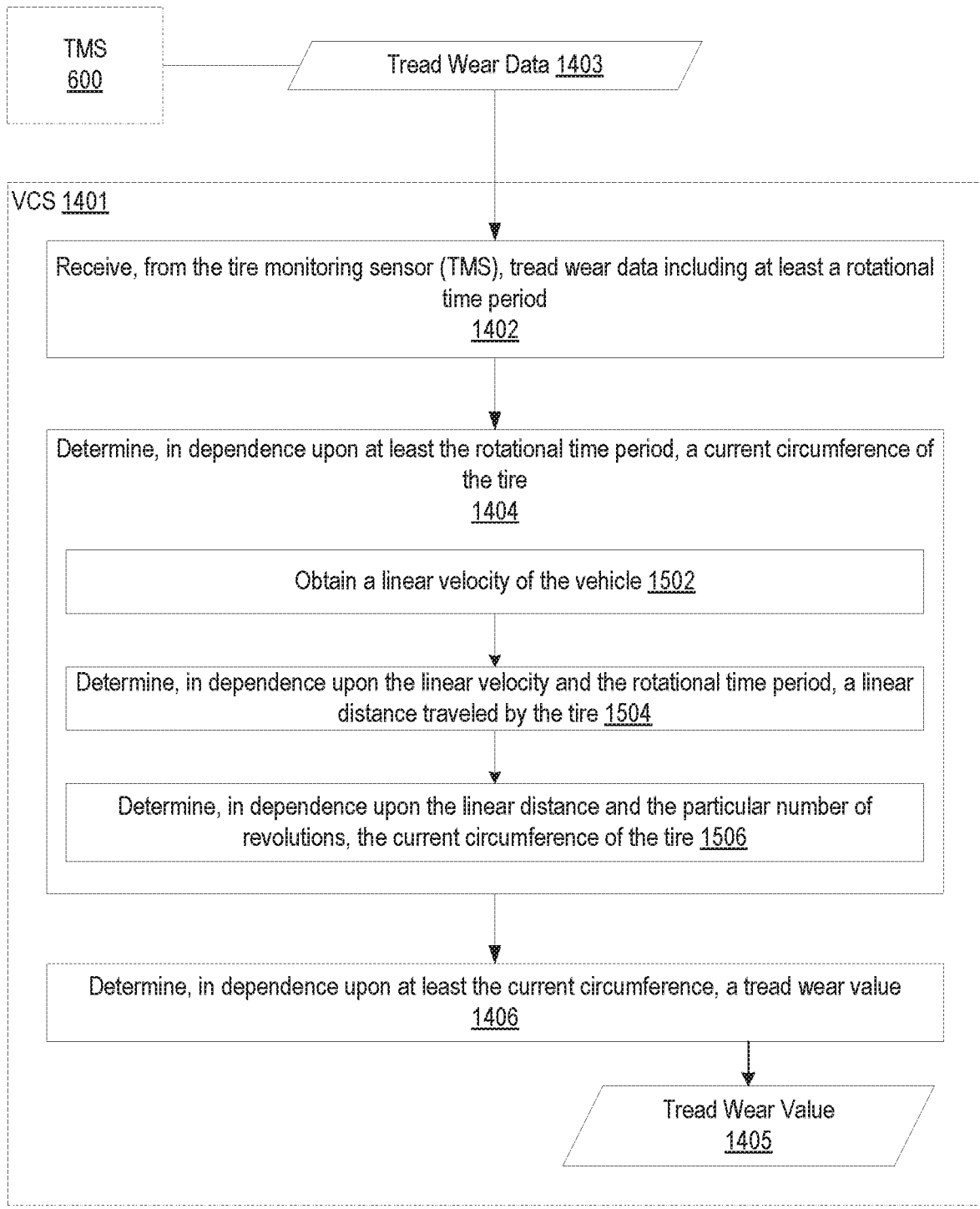
FIG. 15 sets forth a flowchart of another example method for enhanced tracking of tire tread wear in accordance with the present disclosure.

For further explanation, FIG. 15 sets forth a flow chart illustrating an exemplary method for enhanced tracking of tire tread wear according to embodiments of the present disclosure. Like the FIG. 14, the method of FIG. 15 includes receiving (1402), from the tire monitoring sensor (TMS), tread wear data including at least a rotational time period; determining (1404), in dependence upon at least the rotational time period, a current circumference of the tire; and determining (1406), in dependence upon at least the current circumference, a tire tread wear value.

The method of FIG. 15 differs from the method of FIG. 14 in that determining (1404), in dependence upon at least the rotational time period, a current circumference of the tire includes obtaining (1502) a linear velocity of the vehicle. Obtaining (1502) a linear velocity of the vehicle may be carried out by the VCS (1401) obtaining a linear velocity from a position tracking system, such as a global navigation satellite system. Examples of global navigation satellite systems include GPS, GALILEO, GLONASS, COMPASS, etc. The linear velocity may be obtained from a position tracking sensor on the vehicle (e.g., the cellular/satellite transceiver (407) of FIG. 4 or the GPS receiver (557) of FIG. 5A), or from a position tracking sensor on a smart device within the vehicle (e.g., the GPS receiver (591) of FIG. 5B). Assuming a constant linear velocity, the linear velocity is the velocity of the vehicle for the entire duration of the rotational time period measurement.

The method of FIG. 15 also differs from the method of FIG. 14 in that determining (1404), in dependence upon at least the rotational time period, a current circumference of the tire further includes determining (1504), in dependence upon the linear velocity and the rotational time period, a linear distance traveled by the tire. Determining (1504), in dependence upon the linear velocity and the rotational time period, a linear distance traveled by the tire may be carried out by the VCS (1401) multiplying the linear velocity by the rotational time period to determine the linear distance traveled during the particular number of revolutions for which the rotational time period was measured.

The method of FIG. 15 also differs from the method of FIG. 14 in that determining (1404), in dependence upon at least the rotational time period, a current circumference of the tire further includes determining (1506), in dependence upon the linear distance and the particular number of revolutions, the current circumference of the tire. Determining (1506), in dependence upon the linear distance and the particular number of revolutions, the current circumference of the tire may be carried out by the VCS (1401) dividing the linear distance by the number of revolutions to determine the current circumference of the tire.

Figure 16:
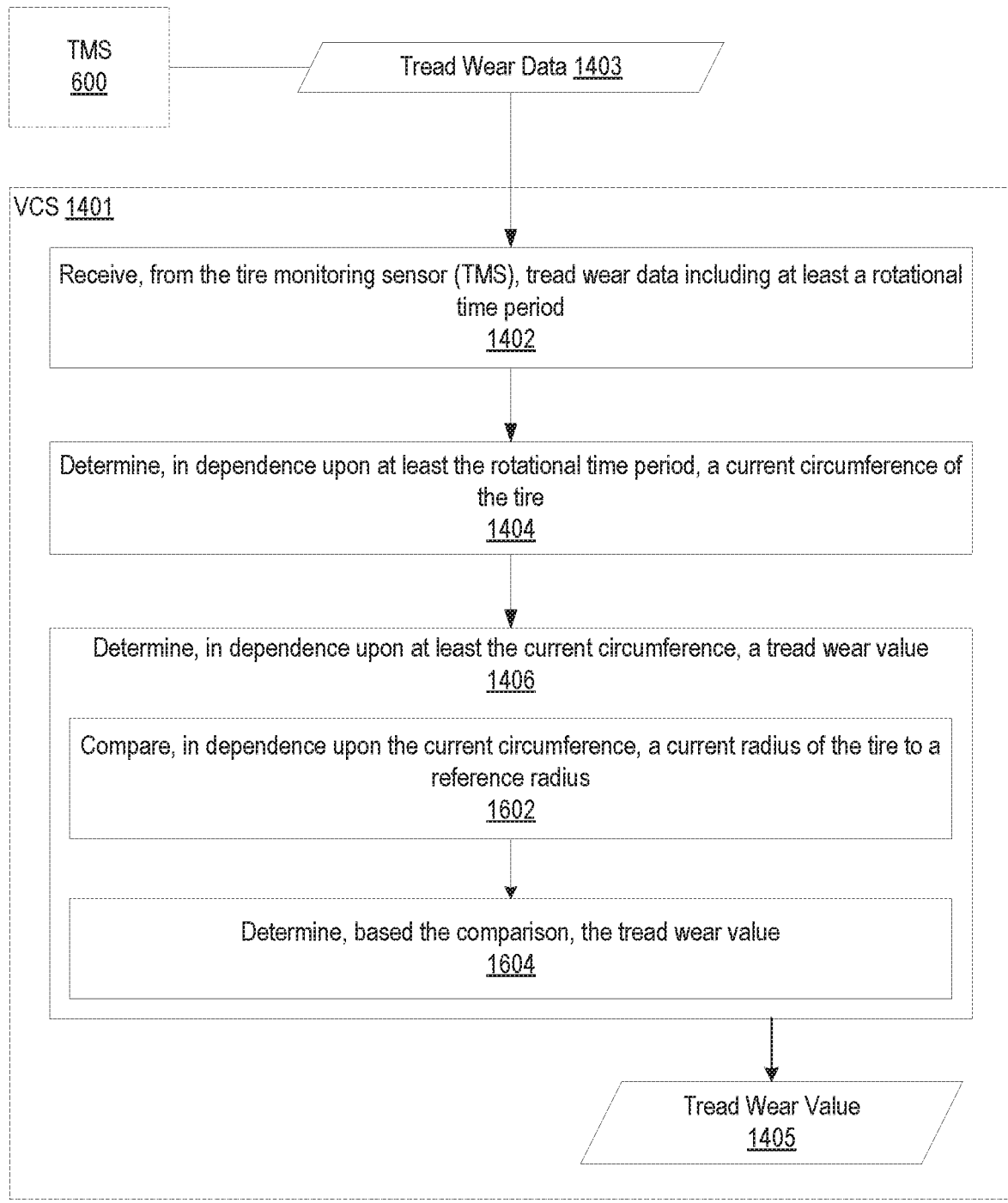
FIG. 16 sets forth a flowchart of another example method for enhanced tracking of tire tread wear in accordance with the present disclosure.

For further explanation, FIG. 16 sets forth a flow chart illustrating an exemplary method for enhanced tracking of tire tread wear according to embodiments of the present disclosure. Like the FIG. 14, the method of FIG. 16 includes receiving (1402), from the tire monitoring sensor (TMS), tread wear data including at least a rotational time period; determining (1404), in dependence upon at least the rotational time period, a current circumference of the tire; and determining (1406), in dependence upon at least the current circumference, a tire tread wear value. The method of FIG. 16 differs from the method of FIG. 14 in that determining (1406), in dependence upon at least the current circumference, a tire tread wear value includes comparing (1602), in dependence upon the current circumference, a current radius of the tire to a reference radius. Comparing (1602), in dependence upon the current circumference, a current radius of the tire to a reference radius may be carried out by the VCS (1401) calculating the current radius of the tire from the current circumference, and comparing the current radius of the tire to a reference radius. The result of the comparison is the difference between the current radius and the reference radius, a tread depth reduction factor. By way of example and not limitation, where the reference radius is 635 mm and the current radius is 633 mm, the comparison indicates a 2 mm reduction in radius, and thus a 2 mm factor of tread depth reduction.

In a particular embodiment, the reference radius is calculated based on the rotational time period measured when the TMS (600) is first initialized with the VCS, i.e., upon new installation and initial operation of the tire. The VCS (1401) may store the reference radius in a memory (e.g., the memory (403) of the VCS (400) or the memory (505) of the TCU (500)). The VCS (1401) may additionally or alternatively transmit the reference radius to the TMS (600) for storing in the memory (605) of the TMS (600). The reference radius may be later provided by the TMS (600) to the VCS (1401) for comparing (1602), in dependence upon the current circumference, the current radius of the tire to the reference radius. Particularly, when a tire is removed and reinstalled or installed on a new vehicle, the reference radius may be obtained from the TCU (600). In some embodiments, tire manufacturer specifications may be used for identifying a reference radius. For example, the reference radius may be the radius of the tire based on manufacturer specifications. The manufacturer specifications may be obtained from the TMS (600) as a tire dimension parameter or from an external data source. Original tread depth may also be identified in manufacture specifications.

The method of FIG. 16 also includes determining (1604), based the comparison, the tread wear value. Determining (1604), based the comparison, the tread wear value may be carried out by the VCS (1401) determining a tread wear value based on the tread depth reduction factor obtained by comparing the current radius of the tire to the reference radius. In one example, the tread wear value is the tread depth reduction factor. In another example, the tread wear value is obtained by subtracting the tread depth reduction factor from the original tread depth (e.g., identified from manufacturer specifications). In this example, where the original tread depth is 8 mm and the tread depth reduction factor is 2 mm, the tread wear value represented by the current tread depth would be 6 mm. In yet another example, the tread wear value is a relative expression of wear, for example, based on the ratio of the tread depth reduction factor to the original tread depth. In this example, where the original tread depth is 8 mm and the tread depth reduction factor is 2 mm, the tread wear value represented by the reduction ratio would be 25%. In a similar example, the original tread depth may be biased by a tread depth for a "worn" tire (e.g., a tread depth of 1.6 mm). In this example, the tread wear value may be expressed as (tread depth reduction factor)/(new tire tread depth–worn tire tread depth), or (2)/(8–1.6)=31.25%.

In some embodiments, the VCS (1401) outputs a numerical tread wear value. In other embodiments, the VCS (1401) may output a tread wear value as an indication that, for example, the tread wear is within acceptable limits, the tread wear is beyond a recommended limit, or the tread wear is beyond a legal limit.

Figure 17:
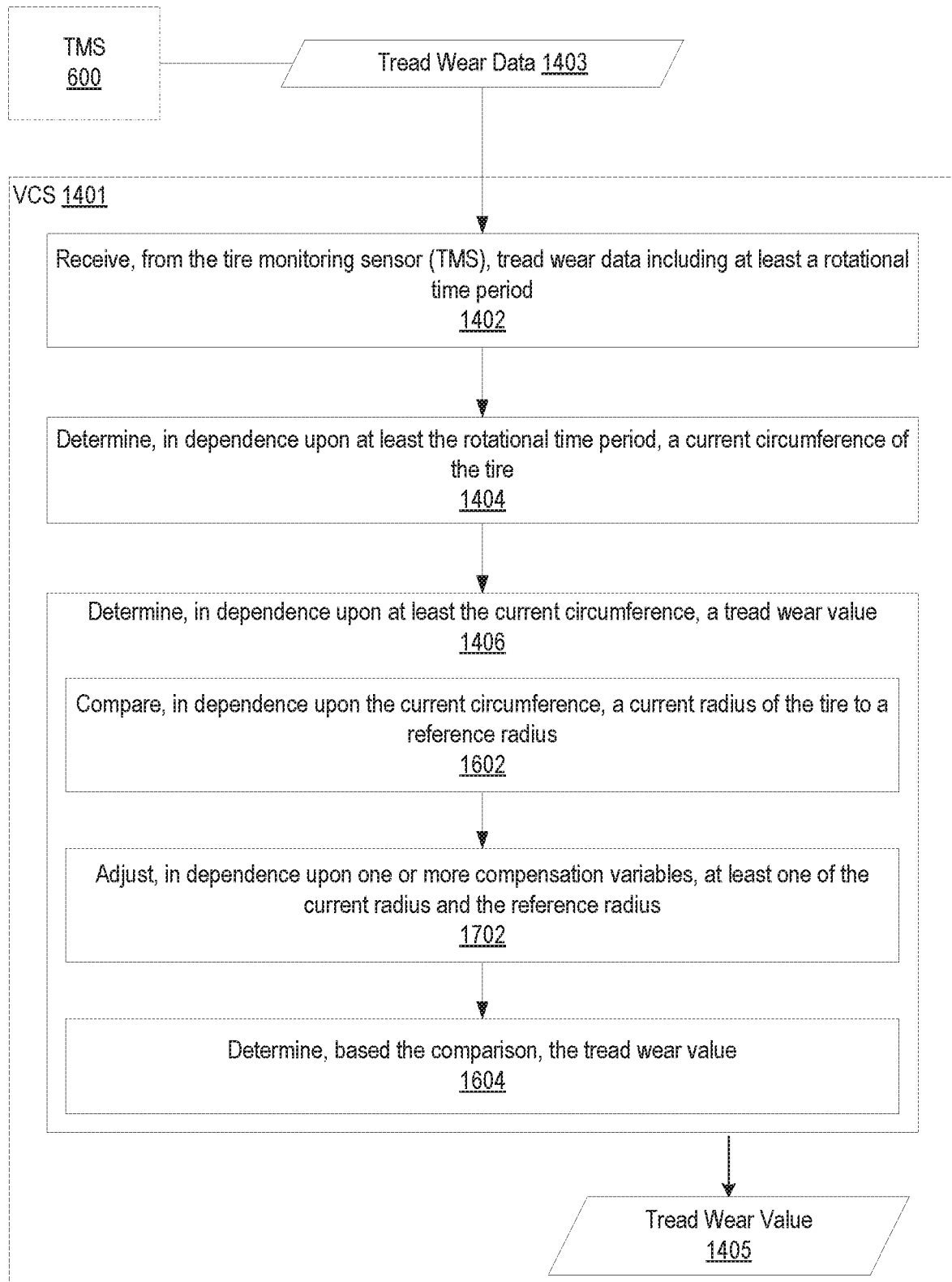
FIG. 17 sets forth a flowchart of another example method for enhanced tracking of tire tread wear in accordance with the present disclosure.

For further explanation, FIG. 17 sets forth a flow chart illustrating an exemplary method for enhanced tracking of tire tread wear according to embodiments of the present disclosure. Like the FIG. 16, the method of FIG. 17 includes receiving (1402), from the tire monitoring sensor (TMS), tread wear data including at least a rotational time period; determining (1404), in dependence upon at least the rotational time period, a current circumference of the tire; and determining (1406), in dependence upon at least the current circumference, a tire tread wear value including comparing (1602), in dependence upon the current circumference, a current radius of the tire to a reference radius and determining (1604), based the comparison, the tread wear value.

The method of FIG. 17 differs from the method of FIG. 15 and FIG. 16 in that, prior to determining (1604) the tire tread wear value, the method of FIG. 17 includes adjusting (1702), in dependence upon one or more compensation variables, at least one of the current radius and the reference radius. Adjusting (1702), in dependence upon one or more compensation variables, at least one of the current radius and the reference radius may be carried out by the VCS (1401) applying compensation variables to the calculation of either the current radius, the reference radius, or both. Compensation variables may include internal factors within the tire system or the vehicle performance, or external factors from the environment affecting the vehicle. Non-limiting examples of compensation variables include angular speed of the tire, tire stiffness, road surface, tire slip, tire pressure, tire temperature, vehicle mass, and effective rolling radius. For example, tire pressure, tire temperature, tire load (vehicle mass), and tire stiffness are factors that affect tire deformation, which may be used to calculate an effective rolling radius, that is, the radius of the tire while in motion. For example, tire identity provides a known circumference for the tire as new. While this may be an acceptable reference, it must be compensated for effective rolling radius. This value lies somewhere between the loaded and unloaded radius of the tire. In this example, either the effective rolling radius of new tire is used as a reference, or the measured circumference (from rotations over distance travelled) must compensated to calculate a non-rolling radius when comparing to the unloaded radius of a new tire. Thus, either the calculated current radius or the reference radius is adjusted for effective rolling radius prior to determining the tread wear value.

As another example, the angular speed of the tire, linear velocity of the vehicle, and effective rolling radius maybe used to calculate tire slip. A tire experiencing tire slip will cause the tire to travel a shorter linear distance in the same rotational time period than the same tire without tire slip. Thus, the current radius of the tire may be adjusted based on the percentage of tire slip.

Figure 18:
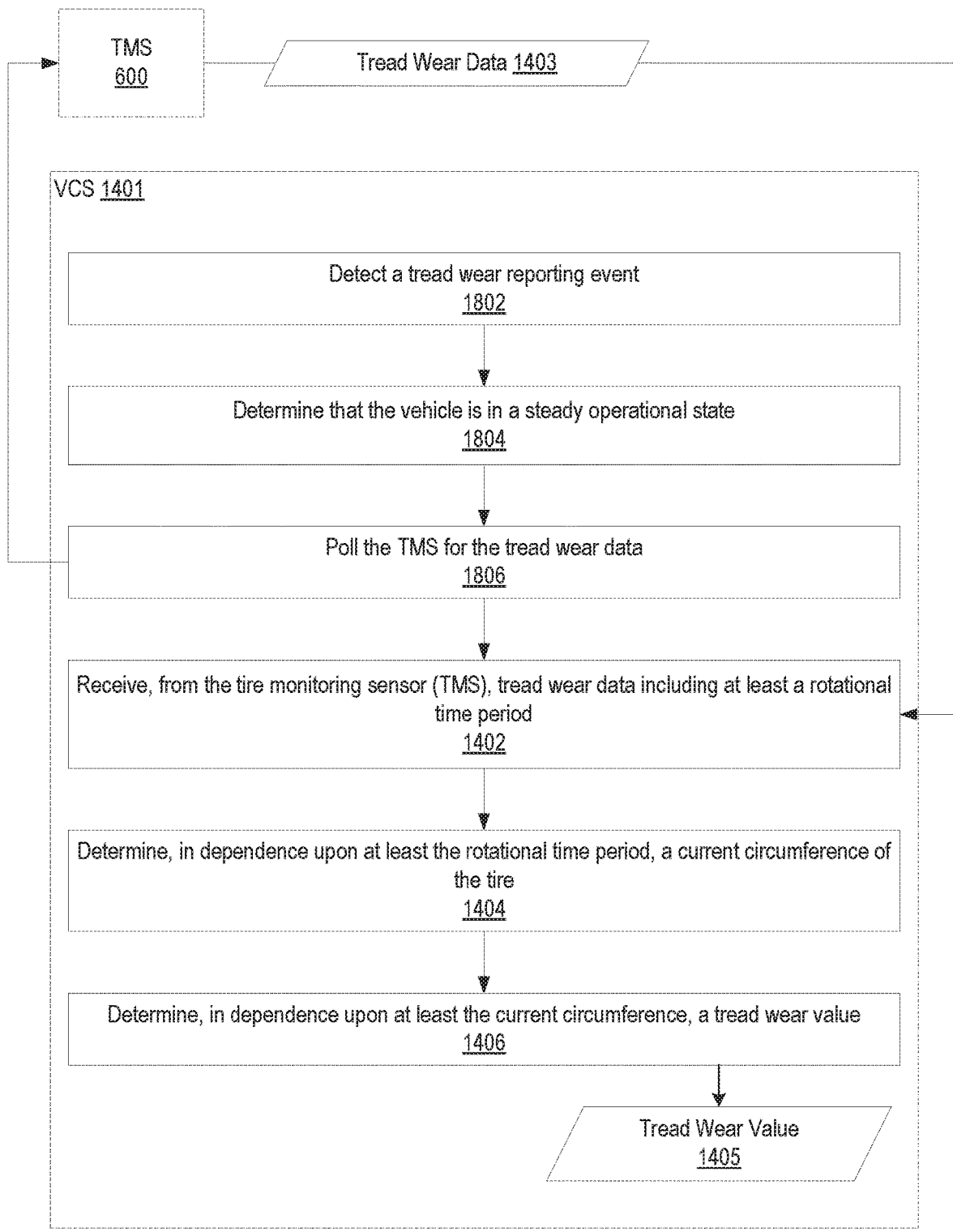
FIG. 18 sets forth a flowchart of another example method for enhanced tracking of tire tread wear in accordance with the present disclosure.

For further explanation, FIG. 18 sets forth a flow chart illustrating an exemplary method for enhanced tracking of tire tread wear according to embodiments of the present disclosure. Like the FIG. 14, the method of FIG. 18 includes receiving (1402), from the tire monitoring sensor (TMS), tread wear data including at least a rotational time period; determining (1404), in dependence upon at least the rotational time period, a current circumference of the tire; and determining (1406), in dependence upon at least the current circumference, a tire tread wear value.

The method of FIG. 18 differs from the method of FIG. 14 in that the method of FIG. 18 includes, prior to receiving the tread wear data (1403), detecting (1802) a tread wear reporting event. Detecting (1802) a tread wear reporting event may be carried out by the VCS (1401) determining that a particular number of journeys have been completed since tread wear data was last received. Detecting (1802) a tread wear reporting event may also be carried out by the VCS (1401) determining that the vehicle has traveled a particular number of miles since tread wear data was last received. Detecting (1802) a tread wear reporting event may also be carried out by the VCS (1401) determining, based on a calendar and/or reporting schedule, that the acquisition of updated tread wear data is due.

The method of FIG. 18 also includes, in response to detecting the tread wear reporting event, determining (1804) that the vehicle is in a steady operational state. Determining (1804) that the vehicle is in a steady operational state may be carried out by the VCS (1401) waiting for the vehicle to achieve a steady operational state based on readings received from sensors such as the wheel speed sensor (411), the yaw rate sensor (413), the inclination sensor (415), and the other sensors (417) of FIG. 4, before requesting or initiating data readings from the TMS. A steady operational state may be determined based on defined operating ranges for tire pressure and temperature, vehicle speed and acceleration, steering angle, engine torque, road surface, etc. Because an instantaneous result is not required for tread depth estimation (due to the long period for tread depth to change), the VCS may wait until a time that the vehicle is operating under ideal conditions for tread wear measurement. For example, an ideal steady operational state may be based on detecting a constant wheel speed and/or when the vehicle acceleration, yaw, and inclination are near zero or below a predetermined threshold. By waiting for the vehicle to achieve a steady operational state, it is not necessary to operate the TMS when the TMS would be processing non-stabilized data. In a particular embodiment, the steady state includes a threshold speed (e.g., at least 50 mph).

The method of FIG. 18 also includes, in response to determining that the vehicle is in a steady operational state, polling (1806) the TMS for the tread wear data. Polling (1806) the TMS for the tread wear data may be carried out by the VCS (1401), once it is determined that the vehicle is in a steady state, sending a wake-up signal or a request message to the TMS (600) indicating that the TMS (600) should measure and/or collect the tread wear data including at least the rotational time period and return the tread wear data to the VCS.

Figure 19:
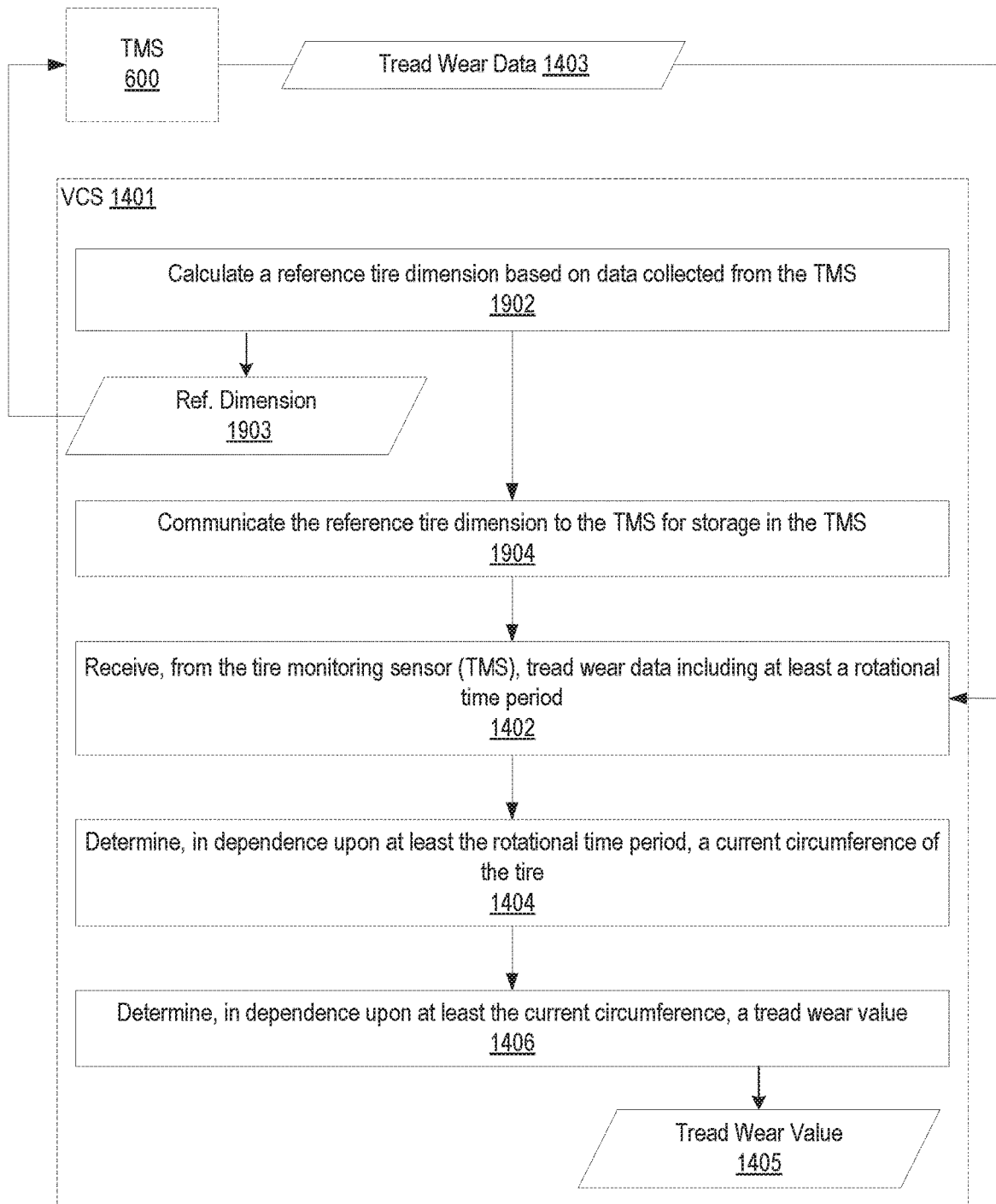
FIG. 19 sets forth a flowchart of another example method for enhanced tracking of tire tread wear in accordance with the present disclosure.

For further explanation, FIG. 19 sets forth a flow chart illustrating an exemplary method for enhanced tracking of tire tread wear according to embodiments of the present disclosure. Like the FIG. 14, the method of FIG. 19 includes receiving (1402), from the tire monitoring sensor (TMS), tread wear data including at least a rotational time period; determining (1404), in dependence upon at least the rotational time period, a current circumference of the tire; and determining (1406), in dependence upon at least the current circumference, a tire tread wear value.

The method of FIG. 19 differs from the method of FIG. 14 in that the method of FIG. 19 includes, prior to receiving (1406) the tread wear data (1403), calculating (1902) a reference tire dimension based on data collected from the TMS. Calculating (1902) a reference tire dimension based on data collected from the TMS may be carried out by the VCS (1401) receiving rotational time period data fora predetermined number of journeys after the TMS (600) is first initialized with the VCS (1401), and calculating a reference tire dimension (1903) based on the rotational time period data collected by the TMS (600). For example, the TMS (600) may be initialized with the VCS (1401) after a first installation of the tire, either during assembly of the vehicle or a subsequent tire replacement. Initializing may be carried out by the VCS (1401) detecting, for the first time, the TMS (600) based on a sensor identifier. For example, when the TMS (600) is a BLE-equipped sensor, the initialization may be carried out by pairing the TMS (600) with the VCS (1401). A fixed number of journeys may be established for calculating the reference tire dimension. For example, the TMS (600) may collect and transmit rotational time period data for N number of journeys after the TMS (600) has been initialized (e.g., paired) with the VCS (1401). The VCS (1401) may then calculate a circumference of the tire based on the average rotational time period for the N number of journeys, which is then used to establish the reference tire dimension. For example, the reference tire dimension may be the circumference, diameter, or radius of the tire based on the rotational time period data collected after N number of journeys. The VCS (1401) may define the parameters for beginning and ending a journey (e.g., N number of engine ignitions or X number of miles traveled), as well as the number N. In a particular embodiment, the reference tire dimension is a reference radius.

The method of FIG. 19 differs from the method of FIG. 14 in that the method of FIG. 19 also includes communicating (1904) the reference tire dimension to the TMS for storage in the TMS. Communicating (1904) the reference tire dimension to the TMS for storage in the TMS may be carried out by the VCS (1401) transmitting, via a transceiver (e.g., the transceiver (405) of FIG. 4 or the transceiver (505) of FIG. 5A or the transceiver (590) of the smart device (580) of FIG. 5B), the reference tire dimension to the TMS (600). The TMS (600) may receive the reference tire dimension and store the reference tire dimension in the memory (603) as a tire parameter. The TMS (600) may then communicate, upon a particular event, the reference tire dimension to the VCS (1401) for use in calculating the tread wear value. For example, the reference tire dimension may be transmitted at the start of a new journey, in response to a wake-up signal from the VCS, and/or as a constituent of the tread wear data. In this manner, the reference tire dimension may reside in the TMS such that when the tire is removed from the vehicle and replaced at a later time, or when the tire is moved from one vehicle to a different vehicle, the VCS may obtain the reference tire dimension data from the TMS. Because this reference tire dimension is calculated based on actual measurements of the tire, the calculated reference tire dimension data may be more accurate that manufacturer specifications that cannot account for variations from tire to tire.

Figure 20:
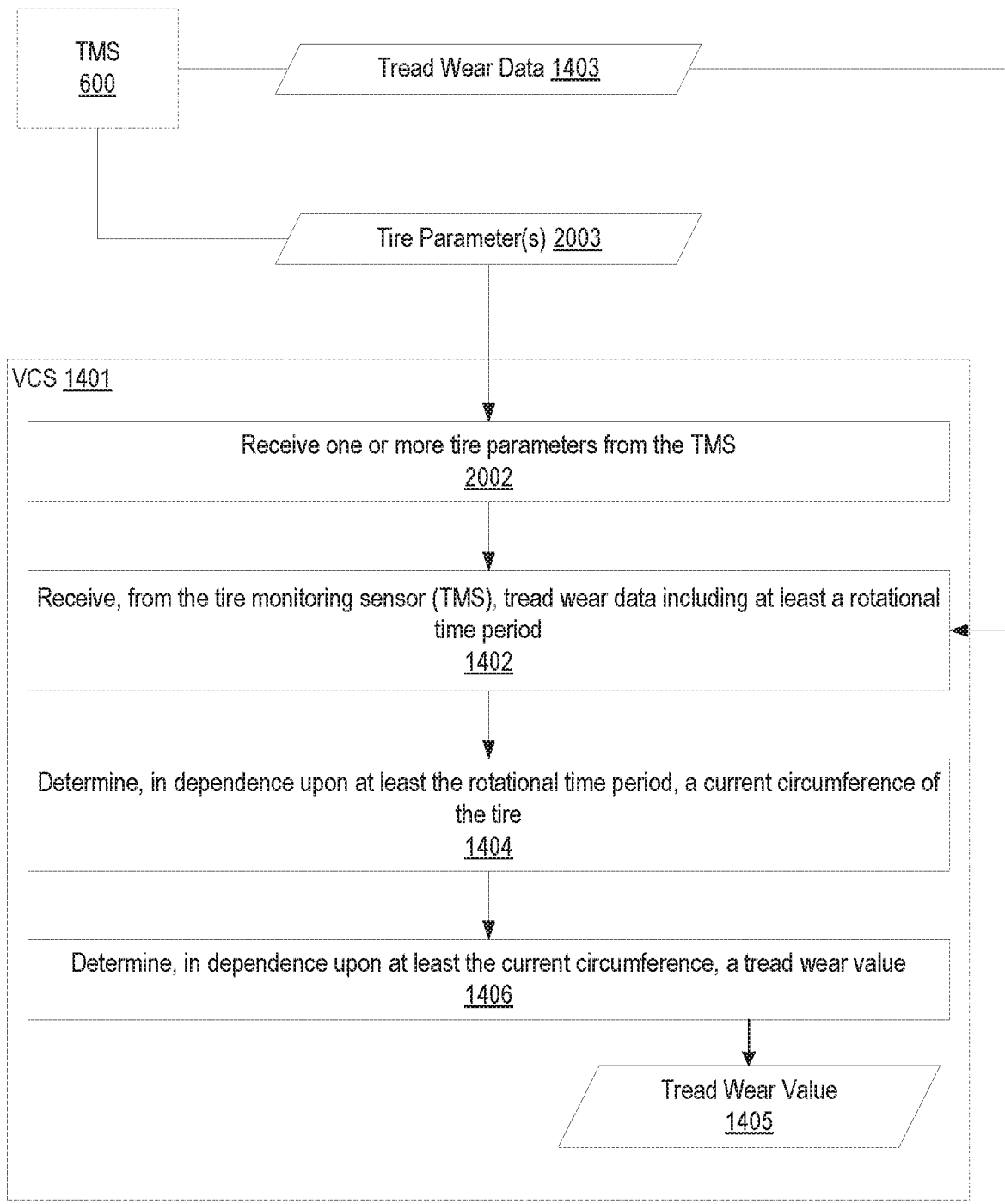
FIG. 20 sets forth a flowchart of another example method for enhanced tracking of tire tread wear in accordance with the present disclosure.

For further explanation, FIG. 20 sets forth a flow chart illustrating an exemplary method for enhanced tracking of tire tread wear according to embodiments of the present disclosure. Like the FIG. 14, the method of FIG. 20 includes receiving (1402), from the tire monitoring sensor (TMS), tread wear data including at least a rotational time period; determining (1404), in dependence upon at least the rotational time period, a current circumference of the tire; and determining (1406), in dependence upon at least the current circumference, a tire tread wear value.

The method of FIG. 20 differs from the method of FIG. 14 in that the method of FIG. 20 also includes prior to receiving the tread wear data, receiving (2002) one or more tire parameters from the TMS. Receiving (2002) one or more tire parameters from the TMS may be carried out by the TMS (600) transmitting one or more tire parameters (2003) to the VCS (1401) upon a particular event, such as but not limited to the start of a new journey, in response to a wake-up signal from the VCS, and/or in response to a request from the VCS. The one or more tire parameters (2003) may include a TMS identifier, tire identification data, tire dimension data, a tire pressure parameter, a tire temperature parameter, a tire mass parameter, a tire load parameter, a tire deformation parameter, and a tire stiffness parameter. In a particular embodiment, the one or more tire parameters includes tire dimension data comprising a calculated reference dimension as discussed above. The calculated reference dimension (e.g., a reference radius) may be based on a measurement of the actual tire on the vehicle. However, it is contemplated that the tire dimension data may include a manufacturer specified tire dimension. In another particular embodiment, the tire pressure parameter, the tire temperature parameter, the tire mass parameter, the tire load parameter, the tire deformation parameter, and/or the tire stiffness parameter may be used as compensation variables for calculating a current radius of the tire.

Although the exemplary methods detailed above have been described with reference to a vehicle control system (e.g., the VCS (400) of FIG. 4), it will be appreciated that embodiments in accordance with the present disclosure may be implemented in a vehicle control system, a TCU (e.g., the TCU (500) of FIG. 5A), or a smart device (e.g., the smart device (580) of FIG. 5B), or combinations thereof. For example, the smart device may communicate directly with the TMS to calculate the tread wear value. As another example, the TCU may communicate directly with the TMS to calculate the tread wear value. As yet another example, the VCS may obtain the linear velocity from the TCU or the smart device to calculate the tread wear value based on tread wear data that the VCS obtains from the TMS. Thus, it is contemplated that the exemplary methods in the above flow charts may be carried out by a combination of devices, apparatuses, and systems as described above.

In view of the explanations set forth above, readers of skill in the art will recognize that the benefits of enhanced tracking of tire tread wear according to embodiments of the present disclosure include, but are not limited to:

Relatively few revolutions of the tire are needed to calculate the updated tire circumference, and thus the tire tread wear value, thereby allowing for fast capture during steady state conditions.

Access to vehicle sensors such as wheel speed sensors or load sensors is not required to calculate the updated tire circumference, and thus the tire tread wear value.

The tire monitoring sensor may provide stored tire characteristics, including reference dimensions, to the vehicle control system even when the tire is moved from vehicle to vehicle or removed and later reinstalled.

Exemplary embodiments of the present invention are described largely in the context of a fully functional computer system for enhanced tracking of tire tread wear. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or other devices to cause a series of operational steps to be performed on the computer, other programmable apparatuses or other devices to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, apparatuses, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of enhanced tracking of tire tread wear in a tire monitoring sensor (TMS), the method comprising:
    detecting, by the TMS coupled to a tire, a tread wear reporting event;
    in response to detecting the tread wear reporting event, generating, by the TMS, tread wear data including at least a rotational time period, wherein the rotational time period is a measure of time a tire takes to complete a particular number of revolutions; and
    transmitting, by the TMS, the tread wear data including the rotational time period to a vehicle control system.

2. The method of claim 1, wherein detecting, by the TMS, the tread wear reporting event includes determining that one or more conditions for reporting the tread wear data are met.

3. The method of claim 1, further comprising, prior to generating the tread wear data including at least the rotational time period, determining that the tire is in a steady operational state.

4. The method of claim 1, wherein generating, by the TMS, the tread wear data including at least the rotational time period includes:
    sampling accelerometric signals from an accelerometer;
    identifying a sequence of peaks in an accelerometric waveform, a time between each peak being indicative of one revolution of the tire;
    counting a number of sampled accelerometric signals between each peak; and
    determining, based on the number of sampled accelerometric signals, a length of time for the tire to complete the particular number of revolutions.

5. The method of claim 1, further comprising:
    receiving, from the vehicle control system, by the TMS, a reference tire dimension;
    storing, by the TMS, the reference tire dimension; and
    upon detecting the tread wear reporting event, sending, by the TMS, the reference tire dimension to the vehicle control system.

6. The method of claim 1, further comprising transmitting, to the vehicle control system, one or more tire parameters.

7. The method of claim 6, wherein the one or more tire parameters include at least one of a TMS identifier, tire identification data, tire dimension data, a tire pressure parameter, a tire temperature parameter, a tire mass parameter, a tire load parameter, a tire deformation parameter, and a tire stiffness parameter.

8. A tire monitoring sensor (TMS) for enhanced tracking of tire tread wear, the TMS comprising:
- an accelerometric device responsive to acceleration forces of a tire;
- a data processing unit configured to processes signals from the accelerometric device and
- generate, from the signals, tread wear data including at least a rotational time period, wherein the rotational time period is a measure of time the tire takes to complete a particular number of revolutions; and
- a transceiver configured to transmit, to a vehicle control system, the tread wear data including the rotational time period.

9. A method for enhanced tracking of tire tread wear in a vehicle control system (VCS), the method comprising:
- receiving from a tire monitoring sensor (TMS), by the VCS, tread wear data including at least a rotational time period, wherein the rotational time period is a measure of time a tire takes to complete a particular number of revolutions;
- in dependence upon at least the rotational time period, determining, by the VCS, a current circumference of the tire; and
- in dependence upon at least the current circumference, determining, by the VCS, a tread wear value.

10. The method of claim 9, wherein determining, in dependence upon at least the rotational time period, the current circumference of the tire includes:
- obtaining a linear velocity of a vehicle;
- determining, in dependence upon the linear velocity and the rotational time period, a linear distance traveled by the tire; and
- determining, in dependence upon the linear distance and the particular number of revolutions, the current circumference of the tire.

11. The method of claim 9, wherein determining, in dependence upon at least the current circumference, the tread wear value includes:
- comparing, in dependence upon the current circumference, a current radius of the tire to a reference radius; and
- determining, based the comparison, the tread wear value.

12. The method of claim 11, further comprising, prior to determining the tire tread wear value, adjusting, in dependence upon one or more compensation variables, by the VCS, at least one of: the current radius and the reference radius.

13. The method of claim 12, wherein the one or more compensation variables include at least one of angular speed of the tire, tire stiffness, road surface, tire slip, tire pressure, tire temperature, effective rolling radius, and vehicle mass.

14. The method of claim 9, further comprising:
- prior to receiving the tread wear data, detecting, by the VCS, a tread wear reporting event;
- in response to detecting the tread wear reporting event, determining by the VCS, that a vehicle is in a steady operational state; and
- in response to determining that the vehicle is in a steady operational state, polling, by the VCS, the TMS for the tread wear data.

15. The method of claim 9, further comprising:
- prior to receiving the tread wear data, calculating, by the VCS, a reference tire dimension based on data collected from the TMS; and
- communicating, by the VCS, the reference tire dimension to the TMS for storage in the TMS.

16. The method of claim 9, further comprising, prior to receiving the tread wear data, receiving, by the VCS, one or more tire parameters from the TMS.

17. The method of claim 16, wherein the one or more tire parameters include at least one of a TMS identifier, tire identification data, tire dimension data, a tire pressure parameter, a tire temperature parameter, a tire mass parameter, a tire load parameter, a tire deformation parameter, and a tire stiffness parameter.

18. An apparatus for enhanced tracking of tire tread wear comprising:
- a transceiver for receiving, from a tire monitoring sensor (TMS), tread wear data including at least a rotational time period, wherein the rotational time period is a measure of time a tire takes to complete a particular number of revolutions; and
- a controller communicatively coupled to the transceiver and configured to:
- determine, in dependence upon at least the rotational time period, a current circumference of the tire; and
- determine, in dependence upon at least the current circumference, a tread wear value.

* * * * *